US008019390B2

(12) United States Patent
Sindhu

(10) Patent No.: US 8,019,390 B2
(45) Date of Patent: Sep. 13, 2011

(54) STATICALLY ORIENTED ON-SCREEN TRANSLUSCENT KEYBOARD

(76) Inventor: Pradeep Sindhu, Los Altos Hills, CA (US)

( * ) Notice: Subject to any disclaimer, the term of this patent is extended or adjusted under 35 U.S.C. 154(b) by 274 days.

(21) Appl. No.: 12/486,455

(22) Filed: Jun. 17, 2009

(65) Prior Publication Data

US 2010/0323762 A1    Dec. 23, 2010

(51) Int. Cl.
*H04M 1/00* (2006.01)
(52) U.S. Cl. .................. 455/566; 345/173; 345/158
(58) Field of Classification Search .................. None
See application file for complete search history.

(56) References Cited

U.S. PATENT DOCUMENTS

| | | | |
|---|---|---|---|
| 6,501,464 B1 | 12/2002 | Cobbley et al. | |
| 7,036,086 B2 | 4/2006 | Cobbley et al. | |
| 2002/0085038 A1 | 7/2002 | Cobbley et al. | |
| 2004/0004602 A1 | 1/2004 | Cheng et al. | |
| 2005/0253821 A1* | 11/2005 | Roeder | 345/173 |
| 2010/0097327 A1* | 4/2010 | Wadsworth | 345/173 |

OTHER PUBLICATIONS

S. Luck et al., "Spatial Filtering During Visual Search: Evidence From Human Electrophysiology," Journal of Experimental Psychology: Human Perception and Performance, 1994, vol. 20, No. 5, 1000-1014.

* cited by examiner

*Primary Examiner* — Phuoc Doan
(74) *Attorney, Agent, or Firm* — Shumaker & Sieffert, P.A.

(57) ABSTRACT

In general, techniques are described for presenting a statically oriented on-screen translucent keyboard. For example, a mobile device may comprise a touch-screen display that displays content from a software application executing on the mobile device and keyboard content defining a translucent on-screen keyboard. The touch-screen display may display the content and the translucent on-screen keyboard in the same orientation relative to the mobile device. The mobile device may further comprise an orientation module that detects a change in orientation of the mobile device. In response to detecting the change in the orientation of the mobile device, the touch-screen display may display the content and the translucent on-screen keyboard in a different orientation from one another relative to the mobile device. The touch-screen display may not change the orientation of the translucent on-screen keyboard. In this respect, the on-screen translucent keyboard remains statically oriented.

23 Claims, 15 Drawing Sheets

STATICALLY ORIENTED ON-SCREEN TRANSLUSCENT KEYBOARD

TECHNICAL FIELD

The invention relates to computing devices and, more particularly, to entering data with computing devices.

BACKGROUND

Computing devices are increasingly becoming smaller in size due in part to better hardware fabrication processes that enables smaller processors, storage devices, displays and other components. This trend in smaller hardware components has led to a growth in mobile devices, beginning with notebook computers, transitioning to Personal Digital Assistants (PDAs) and more recently culminating in advanced cellular mobile devices that are commonly referred to as "smart phones." This trend toward smaller hardware components has increased the mobility of computing through smaller form factors without sacrificing computing performance or user functionality. In other words, the trend toward miniaturization of hardware components typically provides the same if not better computing performance and user functionality as the predecessor larger scale hardware components.

While this trend toward miniaturization has enabled users to carry more sophisticated mobile devices with them on a daily basis, the user still must interact with these devices in some manner to utilize the functionality and increased computing performance offered by these devices. The trend to increasingly smaller form factors may therefore be limited by the ability of users to interact with or use the devices. This limit may be referred to as a usability limit and ultimately constrains the ability of the user to input information into such a device.

To overcome this usability limit, many device manufactures have begun to provide different ways by which users may interact with the mobile devices. For example, some mobile devices provide a miniaturized physical keyboard. Other mobile devices eliminate the physical keyboard and provide a touch-screen display with which a user may interact using either a finger or a stylus. By utilizing this touch-screen display, the device manufacturer can eliminate buttons that would otherwise increase the form factor of the mobile device and instead utilize the touch-screen display as a versatile and configurable button. In some instances, the mobile device may utilize the touch-screen display to recognize gestures, such as handwriting or letter gestures, to eliminate physical keyboards and other text entry input devices altogether. As a result, these touch-screen mobile devices may seek to maximize the screen size yet maintain a smaller form factor by eliminating most or all physical buttons or other physical input devices. However, in such cases the user is forced to learn how to interact with a touch-screen keyboard which may behave substantially different from a physical keyboard.

SUMMARY

In general, the disclosure is directed to techniques for presenting a translucent on-screen keyboard via a touch-screen display of a computing device. More particularly, a mobile device, such as a tablet computer, cellular phone or smart phone, may implement the techniques to provide enhanced usability. In addition, the techniques may reduce the amount of time required by an average user to transition from use of a physical keyboard to an on-screen keyboard presented by such as device. For example, the techniques may result in increased efficiency with which a user is able to enter data into and retrieve, view or otherwise access data from the mobile device. The techniques may promote usability through the presentation of the translucent on-screen or virtual keyboard in a manner which more closely mimics the behavior and operation of a physical keyboard. That is, the format and static orientation of the virtual keyboard may be useful in invoking a spatial filtering phenomena of the human visual system and a physiological association in which the user associates the virtual keyboard with a physical keyboard, thereby training the user to interact with the virtual keyboard as if it were a physical keyboard.

For example, a mobile device may comprise a control unit coupled to a touch-screen display. The control unit typically provides an environment for execution of a software application that generates application content. For example, the software application may be a web browser and the application content may include a web page presented within a graphical user interface (GUI), such as an Internet browser GUI. As described herein, the control unit further includes an orientation module, such as an accelerometer, to detect a current physical orientation of the mobile device with respect to a reference point external from the mobile device, typically by way of the pull of gravity. When rendering an image to be presented on the display, the control unit may poll this orientation module to determine the current orientation of the mobile device and generate the application content in accordance with this determined orientation. To illustrate, the control unit may determine that the mobile device is currently oriented in a portrait orientation and generate the application content for the display in accordance with this portrait orientation rather than a landscape orientation.

Specifically, the control unit may include a graphics rendering module that generates an application display layer based on the application content in accordance with the determined physical orientation of the mobile device. Graphics rendering module may then render this application display layer as an application image and display this application image via a touch-screen display included within the mobile device. The user may interact with the image via the touch-screen display by touching various locations on the touch-screen display to select or otherwise interact with portions of the application image. The application module may receive these touches as input defining a location of the touch and resolve the touch to identify which portions of the application image and corresponding application content the user selected.

In some instances, the user may select a text entry field or otherwise input for entering text to the application module and the application module may automatically invoke an on-screen keyboard module. The mobile device may execute or otherwise include this on-screen keyboard module to generate keyboard content for presenting an on-screen keyboard to the user. In other instances, the mobile device, rather than enable the on-screen keyboard though contextual activation, may include a physical keyboard button that the user may select to activate and deactivate the on-screen keyboard. In response to selecting this button, the control unit may invoke the on-screen keyboard module. In yet other instances, the mobile device may detect a defined directional motion via a motion detection module, such as an accelerometer in order to activate or deactivate the on-screen keyboard.

In any event, once invoked, the on-screen keyboard module generates keyboard content for presenting an on-screen keyboard. However, unlike the application module, the on-screen keyboard module may generate the keyboard content independent of the currently determined orientation of the mobile device and in a manner that appears static to the user. That is, the on-screen keyboard module does not poll the orientation module before generating the keyboard content and instead generates the keyboard content in accordance with a static orientation. For example, this static orientation may always be a landscape orientation of the keyboard relative to the form factor of the device and in a consistent screen position such that the keys are always displayed at fixed positions and orientations relative to the physical form factor of the device. The graphics rendering module may generate a graphic overlay layer based on this keyboard content and merge this overlay layer on top of the application display layer to generate a composite image for display via the touch-screen display.

Notably, the generated keyboard content comprises format data that defines a particular format for the on-screen keyboard. First, the format data defines a translucency of the on-screen keyboard such that user may view both the application content and the on-screen keyboard despite the on-screen keyboard overlapping at least in part some of the application content. Second, the format data may define a diffuse edge for each key of the on-screen keyboard represented by a character. The diffuse edge may distinguish the keys of the on-screen keyboard from the underlying application content. Moreover, the format data may define one or more colors for each of the keys to again permit a user to more easily distinguish the on-screen keyboard form the underlying application content.

By providing format data of this type, the techniques may invoke a spatial filtering response known to exist within the human visual system whereby, depending on what a user is focusing his or her attention, the user's visual system may filter out any information that does not capture the focus of attention. By formatting the on-screen keyboard in this manner, the user may focus his or her attention on either the keyboard or the application content and filter that of the keyboard or the application content not currently the focus of attention. Thus, the techniques may promote usability in that mobile device may present the translucent on-screen keyboard and the application content in a manner that maximizes the size of both the on-screen keyboard and the application content, as both may be presented in full-screen size overlapping one another without likely impacting usability given that the user's spatial filter may filter out the "noise" depending on where the focus of attention is placed. This facilitates contextual text entry, where the user enters text in response to the application content, while also providing better text entry insomuch that the keyboard may be larger than conventional virtual or on-screen keyboards that block a portion of the application content.

Moreover, in response to changes in the physical orientation of the mobile device, the control unit may regenerate the application content in accordance with the newly determined orientation but maintains the consistent display of the on-screen keyboard without any change to orientation or position. The graphics rendering module may regenerate the application layer and then regenerate the composite image based on the regenerated application layer and the unchanged keyboard overlay layer. The graphics rendering module may then re-render the composite image from this regenerated composite layer and display this re-rendered composite image via the touch-screen display. Notably, however, to the user the on-screen keyboard remains in the static orientation (e.g., landscape orientation) relative to the mobile device despite the change in orientation of the mobile device and the result change in orientation of the application layer content. This static orientation and position of the keyboard may effectively "train" the user to view the physical, unchanging keyboard and thus aid the user in learning the location of each of the keys of the on-screen keyboard from rote memory. The user, upon learning the location, may interact with on-screen keyboard in a manner in which the user may interact with a physical keyboard. For example, the user may be able to type on the on-screen keyboard without looking at the keys, as is common with physical keyboards but is generally difficult with respect to ever-changing, conventional virtual keyboards. In this respect, the user may develop an association whereby the user associates the on-screen virtual keyboard with a physical keyboard. This association as described above may improve usability.

In one embodiment, a method comprises determining, with a mobile device having a touch-screen display, an orientation of the mobile device, generating, in accordance with the determined orientation, an application layer based on content received from a software application executing on the mobile device and generating, with the mobile device, an overlay layer based on keyboard content that defines a translucent on-screen keyboard in a static orientation relative to the mobile device regardless of the determined orientation. The method further comprises rendering, with the mobile device, a composite image from the content of the application layer and the keyboard content of the overlay layer, and displaying, with the mobile device, the composite image via the touch-screen display such that the content is displayed in the determined orientation and the translucent on-screen keyboard is displayed in the static orientation.

In another embodiment, a mobile device comprises an orientation module that determines an orientation of the mobile device, and a control unit that executes a software application to generate content in accordance with the determined orientation. The control unit includes a keyboard module that generates keyboard content that defines a translucent on-screen display in a static orientation relative to the mobile device. The control unit further includes a graphics rendering module that generates, in accordance with the determined orientation, an application layer based on the content received from the software application, generates an overlay layer based on the keyboard content in the static orientation and regardless of the determined orientation, and renders a composite image from the content of the application layer and the keyboard content of the overlay layer. The mobile device further comprises a touch-screen display that displays the composite image such that the content is displayed in the determined orientation and the translucent on-screen keyboard is displayed in the static orientation.

In another embodiment, a computer-readable medium comprises instructions for causing a programmable processor to determine, with a mobile device having a touch-screen display, an orientation of the mobile device, generate, in accordance with the determined orientation, an application layer based on content received from a software application executing on the mobile device, and generate, with the mobile device, an overlay layer based on keyboard content that defines a translucent on-screen keyboard in a static orientation relative to the mobile device regardless of the determined orientation. The instructions further cause the programmable processor to render, with the mobile device, a composite image from the content of the application layer and the keyboard content of the overlay layer and display, with the mobile device, the composite image via the touch-screen display such that the content is displayed in the determined orientation and the translucent on-screen keyboard is displayed in the static orientation.

In another embodiment, a method comprises displaying, with a touch-screen display of a mobile device, content from a software application executing on the mobile device and keyboard content defining a translucent on-screen keyboard such that the content and the translucent on-screen keyboard are displayed in a same orientation relative to the mobile device, detecting, with the mobile device, a change in orientation of the mobile device, and in response to detecting the change in the orientation of the mobile device, displaying, with the touch-screen display of the mobile device, the content from the software application and the keyboard content defining the translucent on-screen keyboard such that the content and the translucent on-screen keyboard are displayed in a different orientation from one another relative to the mobile device.

In another embodiment, a method comprises generating, with a mobile device that includes a display and a motion detection unit, an application layer based on content received from a software application executing on the mobile device, detecting, with the motion detection unit, a defined directional movement of the mobile device associated with activation of a translucent on-screen keyboard, generating, with the mobile device, an overlay layer based on keyboard content that defines a translucent on-screen keyboard in response to detecting the defined directional movement, rendering, with the mobile device, a composite image from the content of the application layer and the keyboard content of the overlay layer, and displaying, with the mobile device, the composite image via the touch-screen display.

The details of one or more embodiments of the invention are set forth in the accompanying drawings and the description below. Other features, objects, and advantages of the invention will be apparent from the description and drawings, and from the claims.

DETAILED DESCRIPTION

FIGS. 1A-1D are block diagrams illustrating an exemplary mobile device 10 that implements the techniques described in this disclosure. As described in more detail below, mobile device 10 may implement the techniques to present a virtual keyboard 12 (shown in FIG. 1B) in a manner that invokes a physiological response in a user, such as user 14, whereby user 14 associates the virtual keyboard 12 with a physical keyboard. That is, user 14, whose shown in FIGS. 1A-1D holding and interacting with mobile device 10, may come to, over time, visualize virtual keyboard 12 not as being virtual, but as being physical due to the presentation of virtual keyboard 12 in accordance with the techniques described herein.

While described with respect to a mobile device 10 for purposes of illustration, the techniques may be implemented by any computing device having a touch-screen or other interactive display so as to provoke a physiological response whereby the user, such as user 14, associates virtual keyboard 12 with a physical keyboard. For example, any of a tablet personal computer ("tablet PC"), interactive touch-screen televisions or displays, laptop computers, workstations, desktop computers, in-dash automobile navigation systems, or other less-mobile devices may implement the techniques described in this disclosure. The techniques should not therefore be limited to mobile devices but may be implemented by any computing device so as to enhance the usability of the computing device in the manner described below.

Usability in this context may comprise a metric by which to measure a degree of interaction with respect to a particular device. Usability may generally refer to the overall look and feel of a device, e.g., a device form-factor, combined with a degree of cohesion of operation while performing different actions. Usability may also generally reflect the ability of a user to enter input into or communicate with the mobile device efficiently and retrieve or otherwise view data presented by the mobile device. In the context of the techniques described herein, usability may refer to the efficiency with which a user, such as user 14, enters data into and retrieves, views or otherwise accesses data from mobile device 10.

Figure 1A:
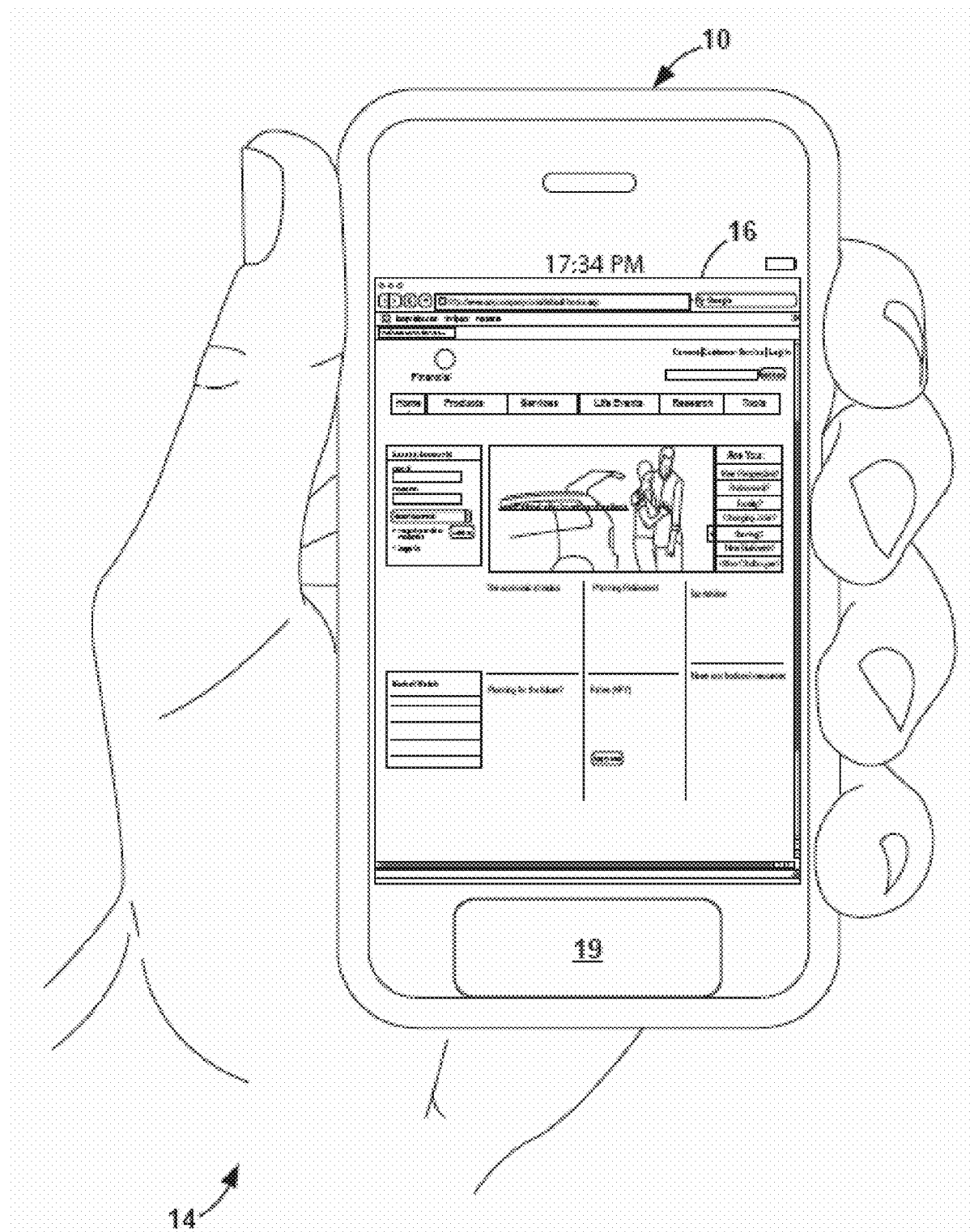
FIGS. 1A-1D are block diagrams illustrating an exemplary mobile device that implements the techniques described in this disclosure.

As shown in FIG. 1A, a left hand of user 14 is shown holding mobile device 10. Mobile device 10 comprises a cellular mobile telephone that provides advanced functionality when compared to standard cellular mobile phones. This type of cellular mobile phone that provides this advanced functionality or computing platform may be referred to as a "smart" phone. While described within the context of a smart phone 10, the techniques may again be implemented by any computing device, including other types of mobile devices, such as personal digital assistants (PDAs), tablet personal computers (tablet PCs), digital cameras, global positioning system (GPS) devices, digital music players or devices (Moving Picture Expert Group-1 Audio Layer 3 or MP3 players), portable digital video data (DVD) devices or players, or combinations thereof. The techniques therefore should be limited to smart phone 10 shown in FIGS. 1A-1D but may be implemented by any type of mobile device.

Figure 1B:
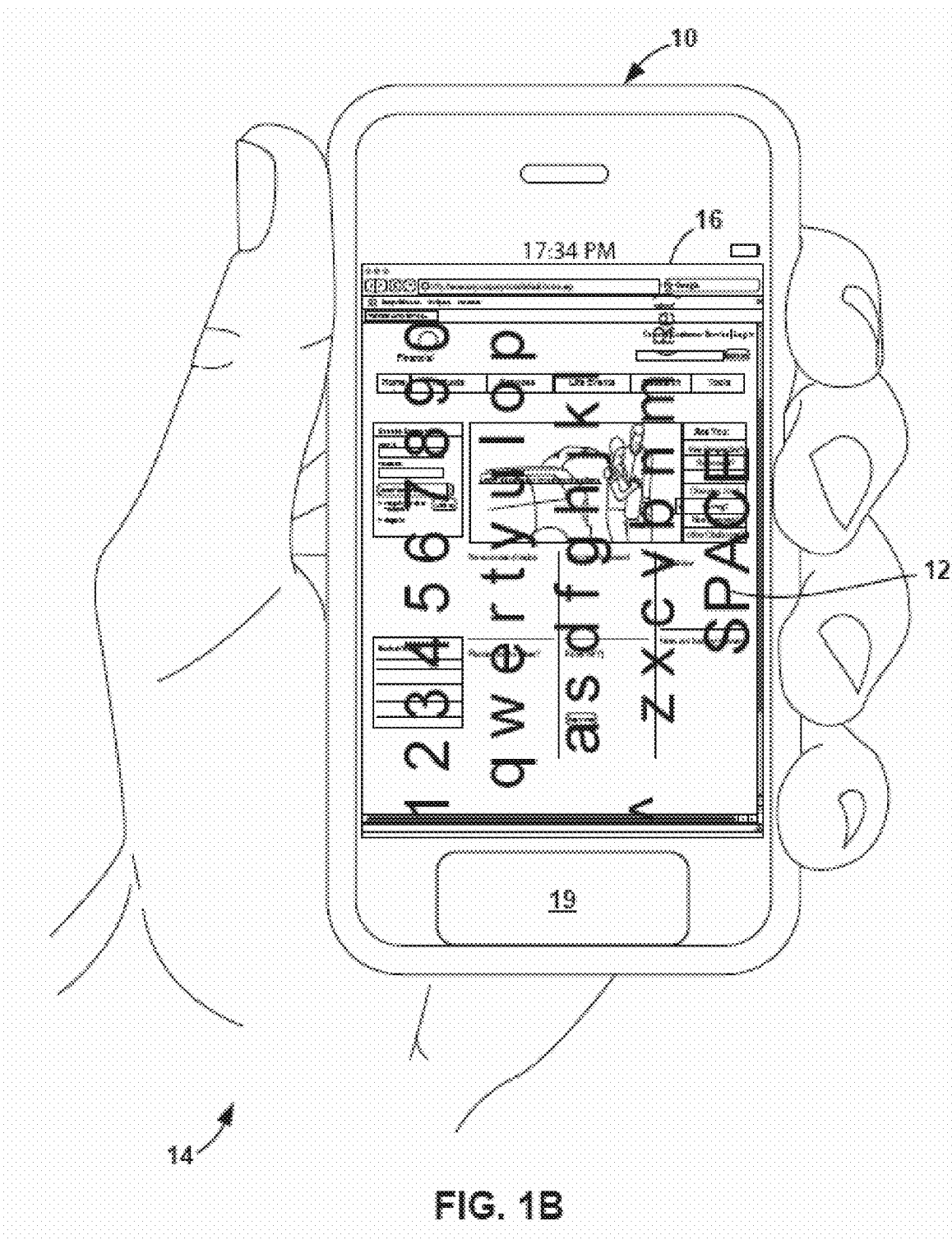

Mobile device 10 includes a display 16 that presents virtual keyboard 12 shown with respect to FIG. 1B. Display 16 comprises a touch-screen display or any other type of interactive display with which user 14 may interact to enter input or data. For ease of illustration purposes display 16 is assumed to comprise a touch-screen display and display 16 may therefore be referred to as touch-screen display 16. Touch-screen display 16 may sense a "touch" from a user using one or more of a number of technologies. Touch-screen display 16 may comprise a resistive touch-screen display or panel having multiple layers. One of the multiple layers may comprise a thin metallic electrically conductive layer while another one of the multiple layers may comprise a thin electrically resistive layer. The conductive and resistive layers may be separated within the resistive touch-screen display by a thin space. In other words, these two layers are adjacent to one another and define a thin space within the resistive touch-screen display. When user 14 touches the display with either a finger or a stylus, the resistive and conductive layers may come into contact and begin conducting, where a touch-screen module within mobile device 10 that monitors touch-screen display 16 may detect a change in current or current draw between these layers and thereby detect the "touch."

Another type of touch-screen display technology comprises a capacitive touch-screen display or panel. Capacitive touch-screen displays are typically coated with a material, such as indium tin oxide, that conducts a continuous electrical current across a touch screen module (e.g., a sensor) underlying the conductive coating material. The underlying sensor may generate and precisely control a field of voltage, e.g., electrons, over the conductive coating material. By storing these electrons within the conductive coating material, the capacitive touch-screen display provides capacitance. The human body also stores electrons and therefore also exhibits capacitance. When a finger of a user, such as user 14, comes into close proximity with and touches the capacitive touch-screen display, the sensor may detect changes in capacitance reflected as a slight voltage drop proximate to the point of contact of the finger. The underlying sensor or touch-screen module may then calculate a coordinate position of the touch.

Capacitive touch-screen displays may provide a feature referred to as "multi-touch." Multi-touch capacitive touch-screen displays may detect more than one "touch" at a time and return coordinate positions for each overlapping touch, e.g., touches that occur at least in part at the same time. These multi-touch capacitive touch-screen displays may enable more complex gestures with the human hand in that these multi-touch capacitive touch-screen displays may identify gestures involving more than one touch at a time. Resistive touch-screen displays typically do not enable multi-touch due to an inability to resolve a location of the current draw resulting from the user touch. In this respect, capacitive touch-screen displays may facilitate a greater degree of usability (facilitate more efficient entry of input or data) with respect to finger or hand manipulation of the screen over purely resistive touch-screen displays. Resistive touch-screen displays however may enable use of a stylus or other non-capacitive implement and thereby provide for handwriting recognition or other continuous single-touch gestures using these non-capacitive implements. Capacitive touch-screen displays may not recognize input entered with non-capacitive implements as these capacitive displays rely on the capacitive nature of the implement, e.g., human finger, used to input the data to accurately detect the touch.

While the above resistive and capacitive types of touch-screen displays are generally the most common type of touch-screen display for mobile or portable computing devices, touch-screen display 16 may comprise any other type of less common touch-screen displays. For example, touch-screen display 16 may comprise one of a projected capacitance touch-screen display that overcomes certain proximity limitation of capacitive touch-screen displays. Touch-screen display 16 may, in another example, comprise an optical (e.g., infrared or IR) touch-screen display that utilizes light-emitting diodes and photosensors to detect "touches." Touch-screen display 16 may, in other instances, comprise any other form or type of touch-screen display, including a surface acoustic wave (SAW) touch-screen display, a strain gauge touch-screen display, an optical imagine touch-screen display, a dispersive signal touch screen display and a acoustic pulse recognition touch-screen display.

In the example shown in FIG. 1A, touch-screen display 16 is currently displaying application content 18 in a portrait orientation. Application content 18 may comprise data generated by application software executing on a computing platform, such as a mobile operating system (O/S). Application content 18 may comprise a webpage (such as the example webpage shown in FIG. 1A) generated by a web or Internet browser application. Application content 18 may also comprise a text message presented by a dedicated text messaging application or an email presented by a dedicated email application. In some instances, the Internet browser application may generate email application content by virtue of the Internet browser accessing an email server through a HyperText Transfer Protocol (HTTP) session. In this respect, application content 18 should not be limited strictly to data generated by a certain dedicated application but may include any application content generated by any application.

In some instances, application content 18 may include additional format data not presented explicitly on touch-screen display 16, such as HTTP data related to the presentation of visible portions of application content 18. In other words, application content 18 may include, as one example, not only data defining the characters of the visible text but also data defining the type of font to use when presenting the text. Application content 18 therefore is not limited to only that shown in the example of FIG. 1A. To distinguish between this form of application content and only the viewable application content, the non-viewable or format application data in combination with the viewable application content may be denoted as application content 18', while the image of application content viewed by user 14 may be denoted application content 18. Moreover, application content 18' may include both data retrieved from external sources, such as emails, text messages, webpages, and other data stored to a memory or storage device of device 10, but also data generated by the application itself, such as a user interface. The user interface may comprise a command line interface (CLI), a graphical user interface (GUI), or any other type of interface with which user 14 may interact to view or interact with the retrieved portions of application content 18'.

Application content 18' often defines a user interface presented by an operating system executed by mobile cellular phone 10. In this sense, the operating system may comprise, at least in part, generates application content 18' for presentation to user 14. Thus, application content 18' should not therefore be limited to only data generated by an application executing on the O/S but may include data generated by the O/S itself The techniques are described with respect to application content merely for illustrative purposes and "application content" as used herein may refer generally to a first form or set of data, information or content that is distinguishable or different from a second form of data, information or content. This second form of content may represent keyboard data or information that is also displayed via touch-screen display 16, as shown with respect to FIG. 1B.

Referring to the example of FIG. 1B, touch-screen display 16 is shown to present both application content 18 and virtual keyboard 12. Virtual keyboard 12 may comprise one example of a visual manifestation of keyboard data or content. Insomuch that keyboard content comprises, much like application content 18, both the visible portion and non-visible portion of virtual keyboard 12, such as the format of virtual keyboard 12, keyboard content may be referred to as keyboard content 12' to denote the similarity but distinct difference between the visible manifestation of content 12' as virtual keyboard 12. Keyboard content 12' may comprise any data concerning the content, format, and other visual characteristics of virtual keyboard 12.

User 14 may activate virtual keyboard 12 in one or more ways. For example, mobile device 10 may comprise a dedicated keyboard button 19 ("KB button 19") by which to activate and deactivate virtual keyboard 12, e.g., activate and deactivate display of virtual keyboard 12 via touch-screen display 16. In other instances, virtual keyboard 12 may be contextually activated in that user 14 may be interacting with an application and the application may trigger display of virtual keyboard 12. In these contextually activated instances, the application may activate virtual keyboard 12, for example, in response to user 14 entering input or data via touch-screen display 16 selecting a text box or other text input field. To deactivate virtual keyboard 12 in these contextually activated instances, virtual keyboard 12 may provide a virtual key to exit or deactivate virtual keyboard 12. This key may be labeled as shown in FIG. 1B as return "(Ret)" so as to indicate returning touch-screen input to the application level or scope rather than the keyboard level or scope. Other possible labels for this key may comprise "done," "finished," "exit" or any other suitable label that provides user 14 with a clear understanding of this virtual key's functionality.

In yet other instances, user 12 may activate virtual keyboard 12 by moving mobile device 10 in a first defined directional motion, e.g., an abrupt upward motion. User 12 may deactivate virtual keyboard 12 by moving mobile device 10 in a second defined directional motion, e.g., an abrupt downward motion. Mobile device 10 may include an accelerometer or other motion detection modules or devices to detect these defined directional motions. "Activation" in this context may refer to bringing virtual keyboard 12 into focus, e.g., moving the focus of input from other layers in a layer stack to the layer that includes virtual keyboard 12 by bringing this layer that contains virtual keyboard 12 to the top of the stack. Activation may also include increasing the opaqueness of virtual keyboard 12 or otherwise reducing the transparency to increase the ability of user 12 to differentiate virtual keyboard 12 from the content included within other layers. "Deactivation" may in this context refer to moving the focus away from virtual keyboard 12, e.g., moving the focus of input from the layer that includes virtual keyboard 12 to other layers in the layer stack by moving the layer containing the virtual keyboard lower in the layer stack. Deactivation may also include decreasing the opaqueness of virtual keyboard 12 or otherwise increasing the transparency to decrease the ability of user 12 to differentiate virtual keyboard 12 from the content included within other layers.

Virtual keyboard 12 may be referred to as "virtual" in that touch-screen display 16 presents keyboard 12 without providing any dedicated physical keys, contacts or other buttons by which to sense each key individually. Instead, virtual keyboard 12 may utilize the general purpose and programmable touch-sensibility of touch-screen display 16 to emulate interactions with a physical keyboard. Virtual keyboard 12 may also be referred to as a virtual on-screen keyboard 12 in that keyboard 12 resides "on-screen" rather than as a separate physical keyboard.

In accordance with one aspect of the techniques, virtual keyboard 12 may comprise a translucent on-screen keyboard 12 in that virtual keyboard content 12' may comprise format data defining a level of translucence or transparency by which touch-screen display 16 presents virtual keyboard 12. Keyboard content 12' may also define virtual keyboard 12 such that each character denoting a virtual key has rough or "fuzzy" edges. Edges may be "fuzzy" in that there is not hard line separating the edges of the character from the background but rather each edge may comprise a diffuse band of color for an edge allowing each key of virtual keyboard 12 to appear fuzzy or intermixed with the background when viewed by user 14. Moreover, virtual keyboard 12 may comprise keys of a set color that is distinguishable from the current background but not overtly noisy with respect to the foreground content, e.g., application content 18. Virtual keyboard content 12' may comprise other format data in addition to that described above that enables user 14 to selectively ignore virtual keyboard 12 when attempting to read or otherwise interact with application content 18 and selectively view or interact with virtual keyboard 12 when attempting to enter text or other characters via virtual keyboard 12.

While not fully understood by science due the complexity of a human visual system, users, such as user 14, typically have what may be referred to as a spatial filter that enables users to eliminate "noise" when reading text. Studies have found that information presented outside the focus of attention receives diminished cerebral processing, which suggests some component of the human visual system provides a spatial filtering mechanism. Moreover, it is hypothesized that attention acts as a filter that forms a gradient of inhibition around a selected location, gating the flow of information from a feature registration stage to an object identification stage in the reading comprehension process. In other words, depending on what a user is focusing his or her attention, the user's visual system may filter out any information that does not capture the focus of attention. Additional information concerning this spatial filtering mechanism and research directed to identifying the filtering mechanism is provided by "Spatial Filtering During Visual Search: Evidence form Human Electrophysiology, copyrighted 1994, from the Journal of Experimental Psychology: Human Perception and Performance, Volu 20, No. 5, pages 1000-1014, incorporated herein by reference.

The techniques described in this disclosure may rely on this aspect of the human visual system in order to maximize utilization of often small screen sizes provided by mobile devices, such as mobile device 10. As a result, mobile device 10, in accordance with the techniques described herein, may generate keyboard content 12' so as to enable the presentation of virtual keyboard 12 in a translucent manner with "fuzzy" or otherwise diffuse character edges and in a color readily distinguishable from application content 18. The appearance of virtual keyboard 12 may be defined in this manner so that virtual keyboard 12 may be easily focused upon and distinguished by users, such as user 14.

As a result of defining the appearance of virtual keyboard 12 in this manner, mobile device 10 may overlay virtual keyboard 12 over application content 18 in the manner shown in FIG. 1B such that application content 18 overlaps, at least in part, the keys of virtual keyboard 12. While at first the overlapping content 18 and 12 may be distracting to user 14 when user 14 has not chosen either keyboard content 12 or application content 18 to be the focus of attention, user 14 upon focusing on either application content 18 or keyboard content 12 may unconsciously invoke the above described spatial filtering mechanism to filter out that of content 18 or 12 on which user 14 has decided not to focus his or her attention. By invoking this physiological filtering response and relying on this response to filter noisy or competing data, mobile device 10 may simultaneously provide, both in full-screen size, keyboard content 12 and application content 18, thereby maximizing utilization of the often small screen sizes of touch-screen display 16.

In other words, rather than, upon activation of an on-screen keyboard, layer the on-screen keyboard as an opaque layer over the application content and thereby detract from a user's ability to view the application content, the techniques may facilitate simultaneous viewing of both on-screen virtual keyboard 12 and application content 18 by invoking the physiological filtering response in users, such as user 14. This may further increase the usability of mobile device 10 in that, often, when entering text or data into a text field of a webpage or other form or type of application content 18, users may base the entry of text on application content 18 currently being displayed by touch-screen display 16.

For example, user 14 may view a webpage, e.g., application content 18, via an Internet browser application that presents a text field with which user 14 may interact to specify text for a search of the Internet. User 14 may select the text box, thereby activating virtual keyboard 12 in the contextual activation mode as described above, and enter text via virtual keyboard 12. User 14 may submit the search text entered into the text field to the search portal, where the search portal may respond with a list of results that the Internet browser application may display as another webpage. This other webpage may also enable searching in the manner described above to facilitate refinement of the current search to retrieve results of narrow or broader scope. Often, when refining the search, user 14 may enter text into the text field of the other webpage given the list of results displayed by the webpage. That is, user 14 may use the list of results as a reference by which to gauge whether to narrow or broaden the scope of the search and enter corresponding text into the text field in order to define this refinement. The techniques may, rather than overlay the keyboard over application content 18 and thereby block or otherwise prohibit viewing of underlying application content 18, simultaneously present both virtual keyboard 12 and application content 18 to facilitate this form of entry of text.

To present simultaneously both virtual keyboard 12 and application content 18 using the full screen size of touch-screen display 16, mobile device 10 may generate an application display layer (or "application layer" for short) based on content received from one or more of a plurality of the above described applications executing on the mobile device. Mobile device 10 may then render and displaying via touch-screen display 16 the application layer to user 14 of the computing device, as shown in FIG. 1A. Mobile device 10 may then receive an input from the user that activates translucent on-screen keyboard 12, whereupon mobile device 10 may generate an overlay display layer based on keyboard content 12' that defines translucent on-screen keyboard 12. Mobile device 10 may then generate a composite layer based on the overlay layer and the application layer and render and display the composite layer via touch-screen display 16 to user 14 such that translucent on-screen keyboard 12 overlays application content 18.

In accordance with another aspect of the techniques, mobile device 10 presents virtual keyboard 12 via touch-screen display 16 in a static orientation that is unaffected by a change in physical orientation of mobile device 10. As shown in FIG. 1B, mobile device 10 presents virtual keyboard 12 via touch-screen display 16 in a landscape orientation despite mobile device 10 being oriented in a portrait orientation. Orientation may refer to an orientation as viewed from the perspective of user 14 when sitting or standing vertically. Often this orientation coincides with, i.e., is determined with reference to, an orientation relative to the pull of gravity. Portrait orientation refers to an orientation where the height of display 16 exceeds the width of display 16 when viewed from the perspective of user 14, while landscape orientation refers to an orientation where the height of display 16 is less than the width of display 16 when viewed from the perspective of user 14.

Figure 1C:
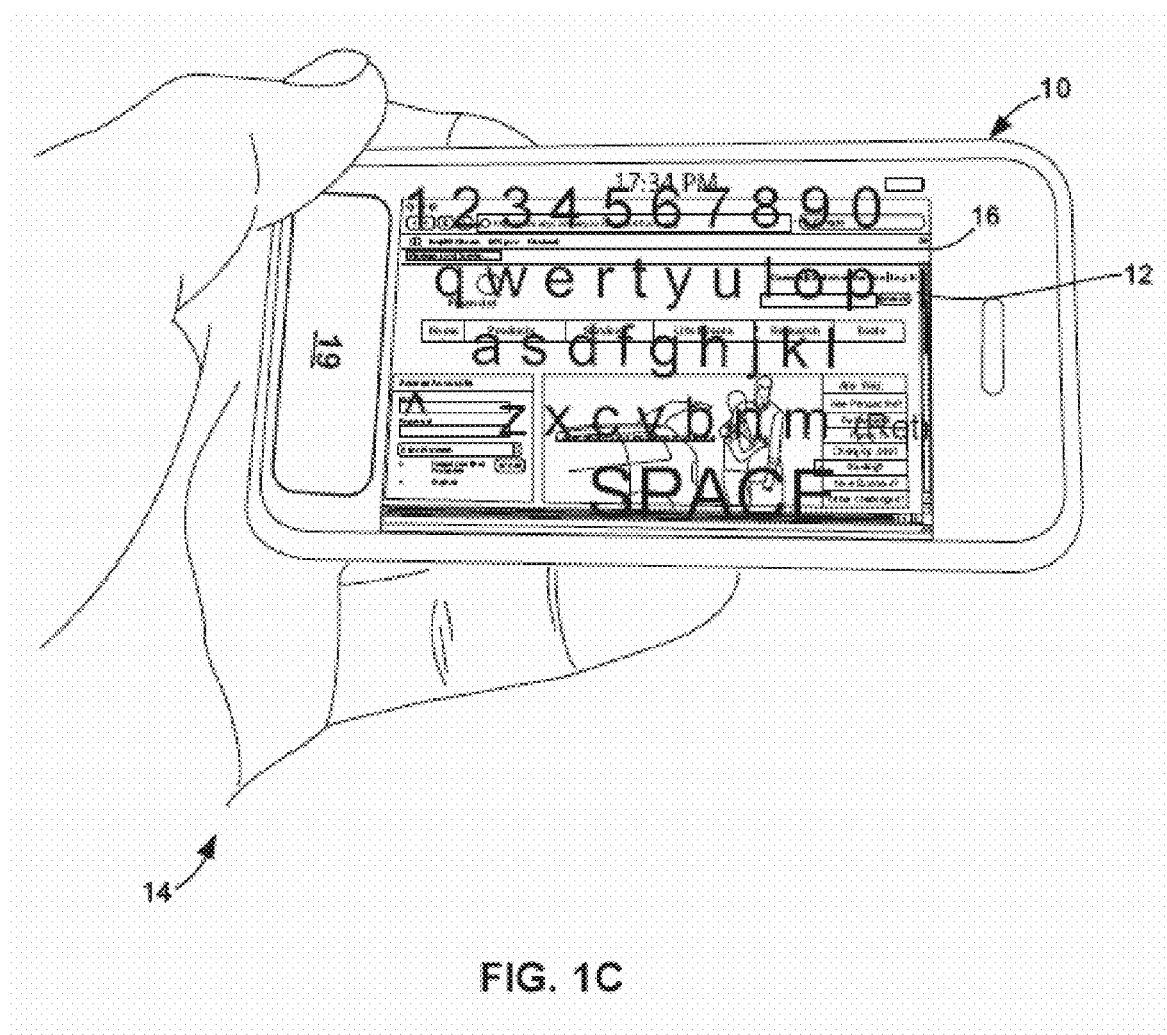

Although not shown in FIGS. 1A-1D, mobile device 10 may include an accelerometer or other component by which to sense changes to the physical orientation and motion of mobile device 10 relative to the vertical pull of gravity. In some instances, mobile device 10 may comprise multi-directional accelerometers or orientation detection modules that sense changes in orientation in multiple directions, e.g., vertically, laterally, and horizontally, relative to the vertical pull of gravity. Mobile device 10 may automatically update application content 10 as displayed via touch-screen display 16 in response to these detected or sensed changes in orientation as shown in FIG. 1C.

FIG. 1C shows user 14 holding mobile device 10 in a landscape orientation. Mobile device 10 has detected via the accelerometer or other orientation detection module this change from the portrait orientation to the landscape orientation and updated application content 18' so as to display application content 18 in the same orientation as mobile device 10, e.g., landscape orientation. Mobile device 10 however has not updated keyboard content 12' to display virtual keyboard 12 in a different orientation than before. Rather, mobile device 10 continues to present keyboard content 12' via touch-screen display 16 as virtual keyboard 12 in the same static orientation, e.g., the landscape orientation.

A number of benefits may be achieved by presenting virtual keyboard 12 in this manner. First, virtual keyboard 12 appears in a static, unvarying orientation to invoke the physiological response in user 14 whereby user 14 associates virtual keyboard 12 with a static or, better stated, unchanging aspects of an actual or physical keyboard. This static orientation may enable user 14 to learn the static location of each key so as to enable user 14 to more efficiently enter data. For example, the techniques may enable user 14 to enter data via virtual keyboard 12 without having to look at the keys much as user 14 may enter data via a physical keyboard without having to look at the individual keys of the physical keyboard. Thus, the static orientation of virtual keyboard 12 may improve the usability of mobile device 10.

Second, by orienting virtual keyboard 12 in the landscape orientation, mobile device 10 may match the landscape layout of a physical keyboard with the landscape orientation of the screen to maximize the size of virtual keyboard 12 when presented via touch-screen display 16. This too may improve the usability of mobile device 10 in that user 14 may find it easier and thereby more efficient to enter data or input using a larger virtual keyboard 12 rather than a cramped portrait oriented virtual keyboard 12 that attempts to replicate the landscape layout of the physical keyboard in the portrait orientation. Not only does presenting keyboard 12 in the more natural landscape orientation facilitate usability of mobile device 10 but such presentation also reinforces the physiological response that causes user 14 to associate virtual keyboard 12 not with an on-screen keyboard but with an actual physical keyboard.

In this respect, mobile device 10 may determine an orientation of mobile device 10 (which may reflect an orientation of touch-screen display 16) by way of an accelerometer or other orientation or motion detection module and generate the above described application display layer based on application content 18' received from an application executing on mobile device 10 in accordance with the determined orientation. Mobile device 10 may also generate the above described overlay display layer based on keyboard content 12' that defines the translucent on-screen keyboard in a static orientation regardless of the determined orientation or the orientation of mobile device 10.

This static orientation is fixed in that this presentation orientation is unaffected by a change in orientation of mobile device 10 and aids the user in considering the keyboard as a physical part of mobile device 10 itself rather than a part of the content presented by the device. This static orientation is therefore defined relative to the form factor of the mobile device that otherwise automatically (e.g., without user intervention or input other than reorienting mobile device 10) sense the change in orientation from a first orientation to a second different orientation, such as a change from portrait orientation to landscape orientation, and dynamically update the content on the display. While described with respect to these automatic orientation sensing devices, the techniques may be implement with respect to device that do not provide this feature and instead rely on manual input of the orientation.

Figure 1D:
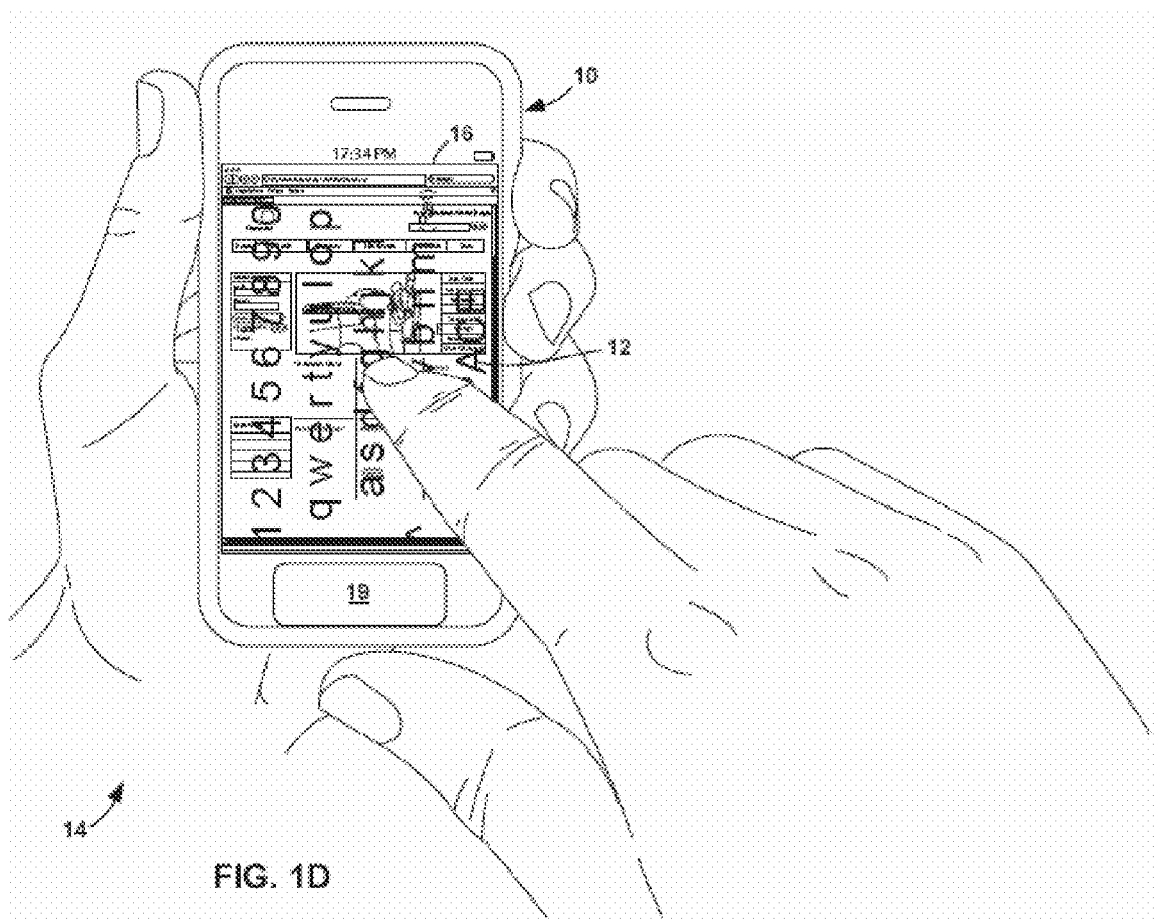

Next, mobile device 10 may, as described above, generate the above-described composite layer based on the overlay layer and the application layer. Mobile device 10 may render composite layer as a composite image and display this composite image via touch-screen display 16 to user 14 such that the application content is displayed in the determined orientation and the translucent on-screen keyboard is displayed in the static orientation, as shown in the example of FIGS. 1B and 1C. By so orienting virtual keyboard 12 in this landscape orientation, user 14 may more naturally interact with virtual keyboard 12 both when mobile device 10 is in the landscape orientation (as shown in FIG. 1C) and when mobile device 10 is oriented in the portrait orientation (as shown in FIG. 1D). When oriented in the landscape mode, interaction by user 14 with virtual keyboard 12 usually occurs via touching touch-screen display 16 near the key with a thumb of each hand or by holding the device in one hand while touching touch-screen display 16 with one or more fingers of the other hand.

Referring to the example of FIG. 1D, interaction with virtual keyboard 12 may occur when mobile device 10 is oriented in the portrait mode or orientation with a single hand of user 14. In this example, user 14 holds mobile device 10 in his or her left hand while one or more fingers of the right hand, turned approximately 90 degrees from the portrait orientation of mobile device 10, touches touch-screen display 16. This form of interaction may provide a more comfortable or ergonomic alternative to entering input when mobile device 10 is portrait oriented. In this respect, the techniques may further increase the usability of mobile device 10 by facilitating data entry when mobile device 10 is oriented in either the landscape and portrait orientations.

Figure 2:
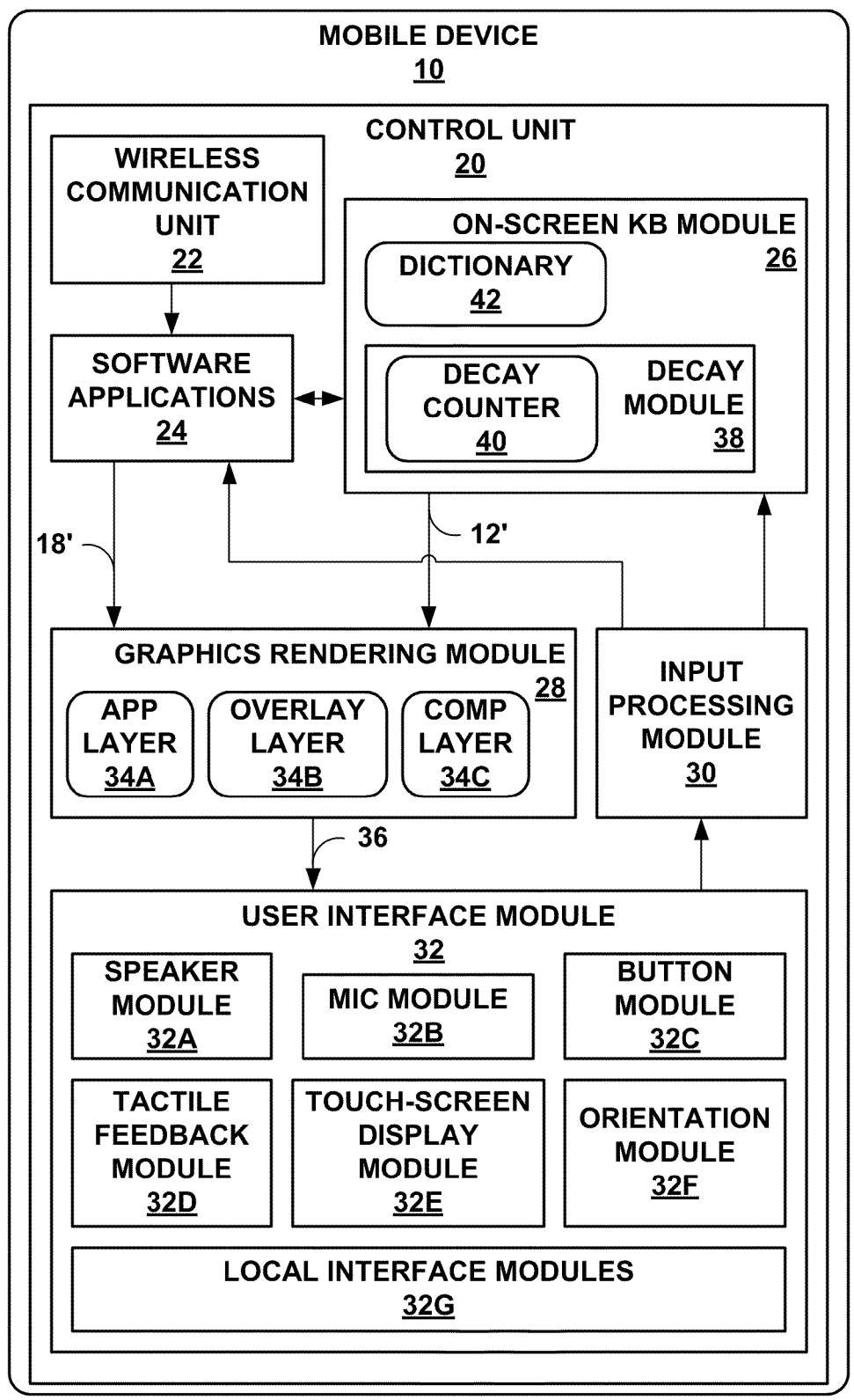
FIG. 2 is a block diagram illustrating an example embodiment of mobile device that implements the techniques described in this disclosure.

FIG. 2 is a block diagram illustrating an example embodiment of mobile device 10 that implements the techniques described in this disclosure. In this example, mobile device 10 includes a control unit 20 having logical functions as shown in FIG. 2. Control unit 20 may comprise any combination of hardware and software that implement the techniques described in this disclosure, and for ease of illustration the underlying hardware components (e.g., such as processors, busses, memory, I/O interfaces and the like) or not shown in FIG. 2. Nevertheless, it is to be understood that control unit 20 may comprise one or more processors, Application Specific Integrated Circuits (ASICs), digital signal processing circuits, integrated circuits or any other processing or control unit or element or combination thereof, and a memory or storage device. In some instances, the memory or storage device (e.g., generally, a computer-readable storage medium) may comprise instructions that cause the programmable processor to perform the techniques described herein. These instructions may form a computer or software program or other executable module that the programmable processor executes to perform the functionality described herein, including the functionality attributed to the techniques of this disclosure.

In the example of FIG. 2, control unit 20 can be logically partitioned into functional units that include a wireless communication module 22, software applications 24, an on-screen keyboard module 26 ("on-screen KB module 26"), a graphics rendering module 28, an input processing module 30, and a user interface module 32.

Wireless communication module 22 may represent hardware and/or software module that enables mobile device 10 to communicate wirelessly with adjacent devices and other more remote devices, such as cellular towers or base stations. Wireless communication module 22 may comprise one or more dedicated processors for wireless communication, such as a BlueTooth processor (or more generally a processor that complies with the Institute of Electrical and Electronics Engineers (IEEE) 802.15 set of standards), a GPS processor, a Digital Signal Processor (DSP), a processor that complies with one or more of the IEEE 802.11 set of wireless Local Area Network (LAN) standards, and a processor that complies with one or more of the various digital cellular technologies, including Global System for Mobile Communications (GSM), General Packet Radio Service (GPRS), Code Division Multiple Access (CDMA), Evolution-Data Optimized (EV-DO), Enhanced Data Rates for GSM Evolution (EDGE), $3^{rd}$ generation GSM (3GSM or 3G for short), Digital Enhanced Cordless Telecommunications (DECT), Digital AMPS, and Integrated Digital Enhanced Network (iDEN). Alternatively, wireless communication module 22 may comprise a single multipurpose processor that implements one or more of these dedicated processors or comprises, in a single silicon die, more than one of these dedicated processors. Wireless communication module 22 may include an antenna and other circuitry by which to transmit and receive signals wirelessly.

Software applications 24 represent any software that executes so as to produce content for display to a user. Typically, software applications 24 execute on an operating system (O/S) platform and provides a particular functionality for use by a user, such as user 14 of FIGS. 1A-1D. Software applications 24 may comprise for example an email application, a word processor application, an Internet browser application, a text messaging application, a video player application, a music or MP3 player application, or any other application. While described as executing on top of the O/S, software applications 24 may, in some instance, include aspects of the O/S itself, such as a graphical user interface of the O/S, which executes on top of lower layers of the O/S to provide a user interface to user 14.

On-screen KB module 26 represent hardware and/or software that generates translucent keyboard content, such as keyboard content 12', for display via touch-screen display 16. On-screen KB module typically includes components of the O/S executed by mobile device 10 as well as hardware components for driving the display as well as receiving input indicative of user touches. Graphics rendering module 28 represents a hardware and/or software module that renders content for display on touch-screen display 16. Graphics rendering module 28 may, in some instances, comprise a dedicated Graphics Processing Unit (GPU) that generates pixelized data for delivery to video buffers associated with the touch-screen display of mobile device 10. Input processing module 30 may represent a hardware and/or software module that processes input received from user interface module 32 and distributes this input to the appropriate module of mobile device 10.

User interface module 32 represent a hardware and/or software module that provides one or more interfaces with which user 14 may interact to enter, receive, access, and view data or content. Typically, components of user interface module 32 may be incorporated within the O/S of the device. Further, in the example of FIG. 2, user interface module 32 includes a number of different hardware components and corresponding software drivers that provide various aspects of the one or more interfaces, such as a speaker module 32A, a microphone module 32B ("mic module 32B"), a button module 32C, a tactile feedback module 32D, a touch-screen display module 32E, an orientation module 32F, and local interface modules 32G.

Speaker module 32A may comprise an interface to one or more physical speakers included within mobile device 10 and control volume and other aspects associated with these one or more physical speakers. Microphone module 32B may comprise an interface to one or more physical microphones included within mobile device 10 and control volume and other aspects of these microphones. Button module 32C may comprise an interface to one or more physical buttons, such as keyboard button 19, and detect button activations, such as depressions of the button. Tactile feedback module 32D may comprise an interface to a tactile feedback device, such as a vibration actuator, that controls activation of the tactile feedback device, e.g., vibration. Touch-screen display module 32E may comprise an interface to touch-screen display 16 by which to present or display content on and control various aspects, such as brightness and contrast, of touch-screen display 16. Orientation module 32F may comprise an interface to an orientation detection module, such as an accelerometer or a multi-directional accelerometer, by which to receive signals or other input identifying a current orientation and/or motion of mobile device 10 with respect to the pull of gravity. Local interface modules 32G may represent one or more interfaces to physical local interfaces, such as a serial port, a Universal System Bus (USB) port, a micro- or mini-USB port, a proprietary port, a headphone port, an optical interface, a Firewire port or any other type of interface, including any other type of audio and/or video input and/or output ports.

Initially, user 14 may hold and view mobile device 10 in a portrait orientation, as is common when viewing most smart phones or other cellular mobile phone devices. Often, the underlying O/S GUI may reside in a static portrait orientation and user 14 may initially hold mobile device 10 to view this GUI in the corresponding portrait orientation (which may also be referred to as "page" orientation in that it reflects the orientation of a standard page). The O/S GUI displayed on touch-screen display 16 may provide for a number of icons or other virtual buttons by which to select an application for execution on mobile device 10. Alternatively, one or more physical buttons of mobile device 10 may trigger execution of one or more associated applications. In any event, user 14 may select one of a plurality of applications for execution on mobile device 10.

User interface module 32 may receive this selection via touch-screen display module 32E or via button module 32C and forward this selection to input processing module 30. Input processing module 30 may invoke the selected application and control unit 20 may execute the selected application as software applications 24. Software applications 24 may, upon execution, generate application content 18' in accordance with a determined orientation for mobile device 10. Software applications 24 may determine the current orientation of mobile device 10 by requesting the current orientation from orientation module 32F. Orientation module 32F may provide an orientation relative to the pull of gravity, such as an angle or other measurement relative to the pull of gravity.

For example, software applications 24 may then determine based on this orientation whether to generate application content 18' in accordance with a landscape orientation or a portrait orientation. Software applications 24 may determine that an angel representative of the orientation that fall within the following ranges of 0 to 45 degrees, 135 to 225 degrees, and 315 to 360 degrees indicate a portrait orientation, while when this angles falls within one of the ranges of 45 to 135 degrees and 225-315 degrees indicates a landscape orientation. Software applications 24 may then generate application content 18 in accordance with the determined orientation for mobile device 10 and forward this content 18 to graphics rendering module 28.

Graphics rendering module 28 generates an application layer 34A ("app layer 34A") two-dimensional pixel data based on application content 18' received from software applications 18. As application content 18' is generated in accordance with the determined orientation, graphics rendering module 28 may generate application layer 34A in accordance with the determined physical orientation of mobile device 10. Layers, as used in this disclosure, may comprise logical display layers or other abstractions by which to separate different aspects of a composite image. Graphics rendering module 28 outputs the pixel data 36 formed from application layer 34A for display to the user. When rendered based solely on application layer 34A (disregarding any O/S layers for purposes of illustration), this pixel data 36 may be referred to as "application image 36." Graphics rendering module 28 may transmit application image 36 to user interface module 32 and particularly, video buffers within touch-screen display module 32E. Touch-screen display module 32E displays application image 36 via touch-screen display 16 for viewing by user 14 as application content 18.

As a result, user 14 is able to view application content 18 as rendered application image 36 via touch-screen display 16. User 14 may then interact with touch-screen display 16 to select portions of application content 18 or otherwise exit or stop execution of the selected application. Assuming for purposes of illustration that application content 18 comprises a webpage similar to that shown in FIG. 1A, user 14 may, as one example, select an address field of application content 18. The address field may comprise a text entry field with which user 14 may interact to specify an HTTP or so-called "web" address (which also may be referred to as a Uniform Resource Locator or URL in some instances). Touch-screen module 32E may receive this "touch" as an input, resolve a location of the touch with respect to touch-screen display 16 and forward this location to input processing module 30. Input processing module 30 may determine that software applications 24 is currently the focus of the touch input and forward the location or, more generally, touch input to software applications 24.

Software applications 24 may determine, based on the touch input, that the location of the touch selects the address field of application content 18 and automatically, without any other user input or interaction, invoke on-screen keyboard module 26 to generate keyboard content 12' for display by touch-screen display 16. Alternatively, user 14 may activate KB button 19, whereupon button module 32C may forward this activation to input processing module 30, which invokes on-screen KB module 26. As another alternative, user 14 move mobile device 10 in a defined directional motion, e.g., an upward motion, which orientation module 32F (which may also be referred to as "motion detection module 32F" with respect to this aspect of the techniques) may detect and forward to input processing module 30. Input processing module 30 may then invoke on-screen KB module 26.

On-screen keyboard module 26 forwards keyboard content 12' to graphics rendering module 28, which in turn generates overlay layer 34B as a second set of two-dimensional pixel data. Graphics rendering module 28 may then generate composite layer 34C based on application layer 34A and overlay layer 34B, e.g., by merging the two-dimensional pixel data for each of the layers to form a single composite set of pixel data in which for any pixel the pixel data of the keyboard overlay data is prioritized over the pixel data for the content. In this way, graphics rendering module 28 may generate composite layer 34C such that it appears as if keyboard content 12' overlays certain aspects of application content 18. While described as an overlay layer, graphics rendering module 28 may, in some instances, generate an underlay layer similar to overlay layer 34B based on keyboard content 12' and underlay underlay layer 34B under application layer 34A. In any event, graphics rendering module 28 generates composite layer 34C based on application and overlay layers 34A and 34B.

After generating composite layer 34C, graphics rendering module 28 outputs composite layer 34C as pixel data 36. In this instance, pixel data 36 may be referred to as a "composite image 36." Composite image 36 may comprise an image in which translucent on-screen keyboard 12 overlays application content 18 in the manner described above with respect to FIGS. 1B-1D to invoke the physiological spatial filtering in the human visual system.

To facilitate this filtering, on-screen keyboard module 26 may generate keyboard content 12' so as to format virtual on-screen keyboard 12 to be distinguishable from application content 18. In one embodiment, on-screen keyboard module 26 may, prior to generating keyboard content 12', analyze application content 18' and, based on this analysis, adapt the format of virtual keyboard 12 to achieve a suitable level of distinguishing characteristics from application content 18. For example, on-screen keyboard module 26 may analyze application content 18' to determine a distribution of color over application content 18'. Based on this distribution of color, on-screen keyboard module 26 may adapt the color of on-screen keyboard 12 such that the characters of on-screen keyboard 12 representative of the keys of keyboard 12 do not overly blend with respect to a co-located portion of application content 18'. On-screen keyboard module 26 may, as another example, increase or decrease a degree of softness to the edges of each key based on this color distribution or increase or decrease a level of transparency or translucency based on the color distribution.

On-screen keyboard module 26 may also analyze application content 18' to identify portions of application content 18' that define images, text, graphics, videos and other types of content, and adapt the format of co-located portions of keyboard content 12' to account for each of these different types of content in a manner similar to that described above with respect to the color distribution. In this manner, on-screen keyboard module 26 may analyze application content 18' and adaptively format keyboard content 12' based on this analysis to distinguish virtual keyboard 12 from application content 18 when viewed by a user, such as user 14. In this respect, mobile device 10 may present virtual keyboard 12 via touch-screen display to invoke the spatial filtering physiological response in user 14 and thereby maximize the available screen space or "real-estate" of touch-screen display 16.

Mobile device 10 may also implement the techniques of this disclosure to invoke a physiological association in user 14 whereby user 14 associates virtual on-screen keyboard 12 with an actual physical keyboard. The techniques facilitate this association by presenting virtual keyboard 12 in a static orientation that is unaffected by changes to (or does not change regardless of the current orientation of) mobile device 10. On-screen keyboard module 26 may for example always generate on-screen keyboard content 12' in a landscape orientation, as shown in the example of FIGS. 1B-1D. In this respect, virtual keyboard 12 may remain in a static location with respect to mobile device 10 and therefore by viewed by users, such as user 14, as a static or unchanging keyboard, much like a physical keyboard. Moreover, by presenting keyboard 12 in this static landscape orientation, virtual keyboard 12 may look similar to the physical landscape layout of actual keyboards, which may further increase this association.

In contrast to the generation of keyboard content 12', software applications 24 may generate application content 18' in accordance with the determined orientation of mobile device 10. Thus, if mobile device 10 changes orientation, software applications 24 may receive from orientation module 32F an update or other notification indicating a change in orientation. For example, orientation module 32F may generate an update for example in response to a change in the orientation of mobile device 10 with respect to the pull of gravity from the portrait orientation to the landscape orientation and issue an orientation update to software applications 24. Software applications 24, in response to this update, may regenerate application content 18' in accordance with the current landscape orientation. Graphics rendering module 28 may then re-render application layer 34A based on regenerated application content 18', thereby rendering application layer 34A in accordance with the current landscape orientation. If virtual keyboard 12 is not active during this change in orientation, graphics rendering module 28 may generate image 36 based only on application layer 34A. However, if keyboard 12 is active, graphics rendering module 28 re-generates composite layer 34C based on regenerated application layer 34A and unchanged overlay layer 34B and renders composite image 36 based on re-rendered composite layer 34C. In this way, the on-screen keyboard is static in nature and the user effectively learns that the keyboard can be treated and manipulated as a physical part of the mobile device rather than part of the content being displayed. Graphics rendering module 28 then transmits image 36 to touch-screen display module 32E, which displays image 36 via touch-screen module 16 to user 14.

In some instances, on-screen keyboard module 26 may repeatedly regenerate on-screen keyboard content 12' to slowly fade virtual keyboard 12 into application content 18 when user 14 does not interact or otherwise enter input selecting a key of virtual keyboard 12. On-screen keyboard module 26 may include a decay module 38 that maintains a decay counter 40. On-screen keyboard module 26 may, upon initially generating keyboard content 12', reset decay counter 40 to a first value and then repeatedly decrement the value stored to decay counter 40. Once the value stored to decay counter 40 reaches zero, decay module 38 may cause on-screen keyboard module 26 to regenerate keyboard content 12' such that virtual keyboard 12 is presented with an increased translucency when compared to the previous presentation of virtual keyboard 12.

Decay module 38 may then reset decay counter 40 to a second value, which may be equal to the first value, less than or greater than the first value. When less that the first value, decay module 38 may implement an exponential translucency decay or some other type of trending decay. In any event, by so increasing the translucency over time, virtual keyboard 12 may appear to slowly dissolve or fade into application content 18 when viewed by user 14. This decay functionality may reduce power consumption and improve usability by automatically removing keyboard 12 from screen 16 in response to receiving no input from the user such that the user may view application content 18 without interference.

However, if user 14 interacts with virtual keyboard 12, on-screen keyboard module 26 may receive this input and determine which of the virtual keys were pressed in a similar manner to that described above with respect to selecting the text field, while decay module 38 also resets decay counter 40 to the first value, thereby causing on-screen keyboard module 26 to regenerate keyboard content 12' with the first or original translucency. On-screen keyboard module 26 may, after resolving the key and the corresponding character for which the key represents, forward the determined key touch to software applications 24, which may update a text field with the determined character. Software applications 24 may then regenerate application content 18' to include this entered character, whereupon graphics rendering module 28 may re-render composite layer 34C as image 36 and cause touch-screen display module 32E to display this image 36 via touch-screen display 16.

In some instances, on-screen keyboard module 26 may generate keyboard content 12' in a context adaptive manner. For example, on-screen keyboard module 26 may comprise a dictionary 42 that comprise a full or partial dictionary listing possible spellings of all or a portion of a given language, such as English. Dictionary 42 may be dynamic in that user 14 may add or otherwise update dictionary 42 with new words or spellings. In any event, on-screen keyboard module 26 may receive a selection of character from user 14 via touch-screen display module 32E and input processing module 30 and resolve the character selected by user 14.

Assuming user 14 selects a 'T' character, on-screen keyboard module 26 may generate keyboard content 12' to highlight the possible next characters in a word beginning with the 'T' character. That is, keyboard module 26 may search dictionary 42 and determine those characters lease likely to follow the 'T' character within the given language and generate keyboard content 12' so as to increase the translucency for the virtual keys of virtual keyboard 12 corresponding to these characters. To illustrate, keyboard module 26 may determine based on dictionary 42 that the 'Z,' 'X,' 'Y,' 'B,' 'C,' and other similar characters do not often follow the 'T' character in the English language. Keyboard module 26 may then generate keyboard content 12' to increase the translucency of the virtual keys corresponding to these determined characters such that when display these virtual keys are less obvious to user 14. In this respect, on-screen keyboard module 26 may generate keyboard content 12' to adapt a translucency or other format characteristic of one or more virtual keys of virtual keyboard 12 to the context of the current word being entered by user 14. This word adaptive aspect of the techniques may improve usability by facilitating correct entry of text. Moreover, by fading unlikely virtual keys into the background, user 14 may better view application content 18 to further facilitate entry of text relative to application content 18.

Figure 3A:
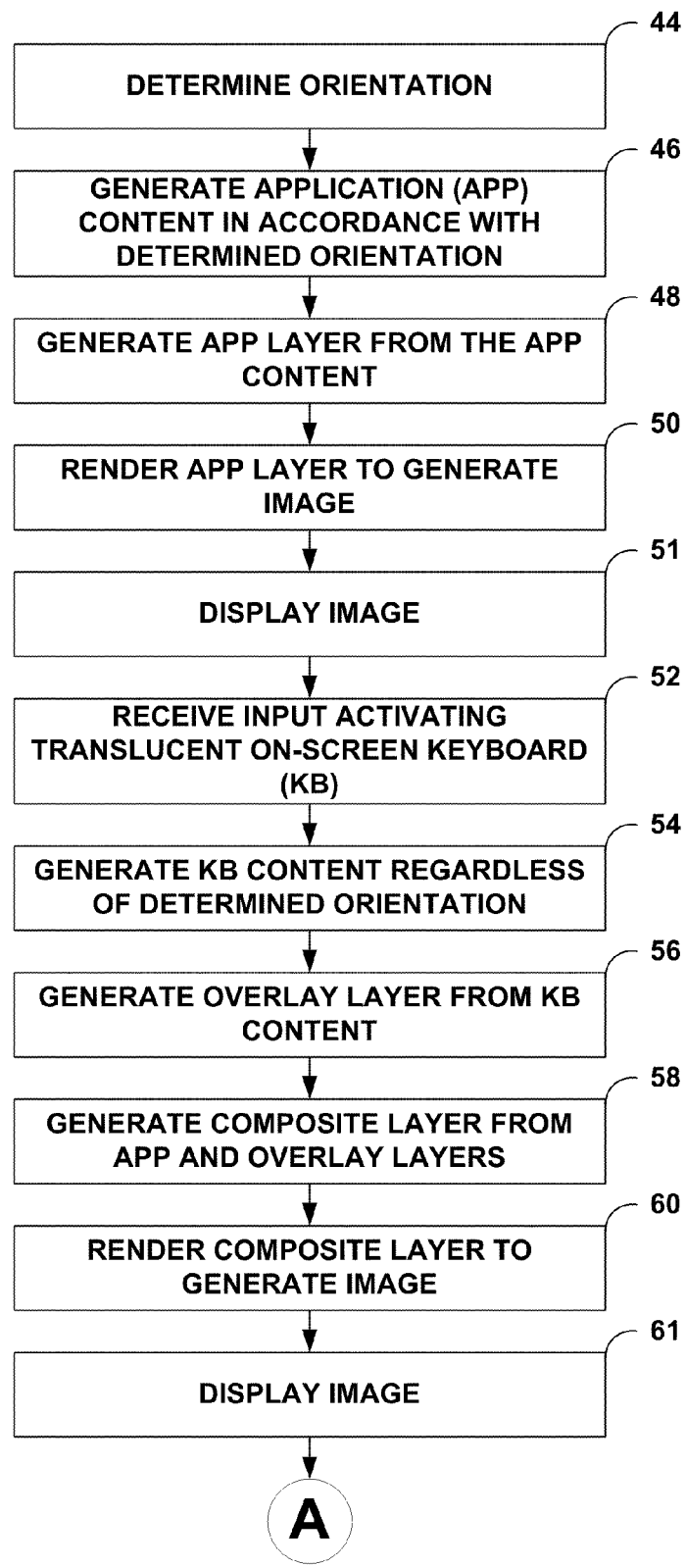
FIGS. 3A-3C are flowcharts illustrating example operation of a computing device in implementing the techniques described in this disclosure.
Figure 3B:
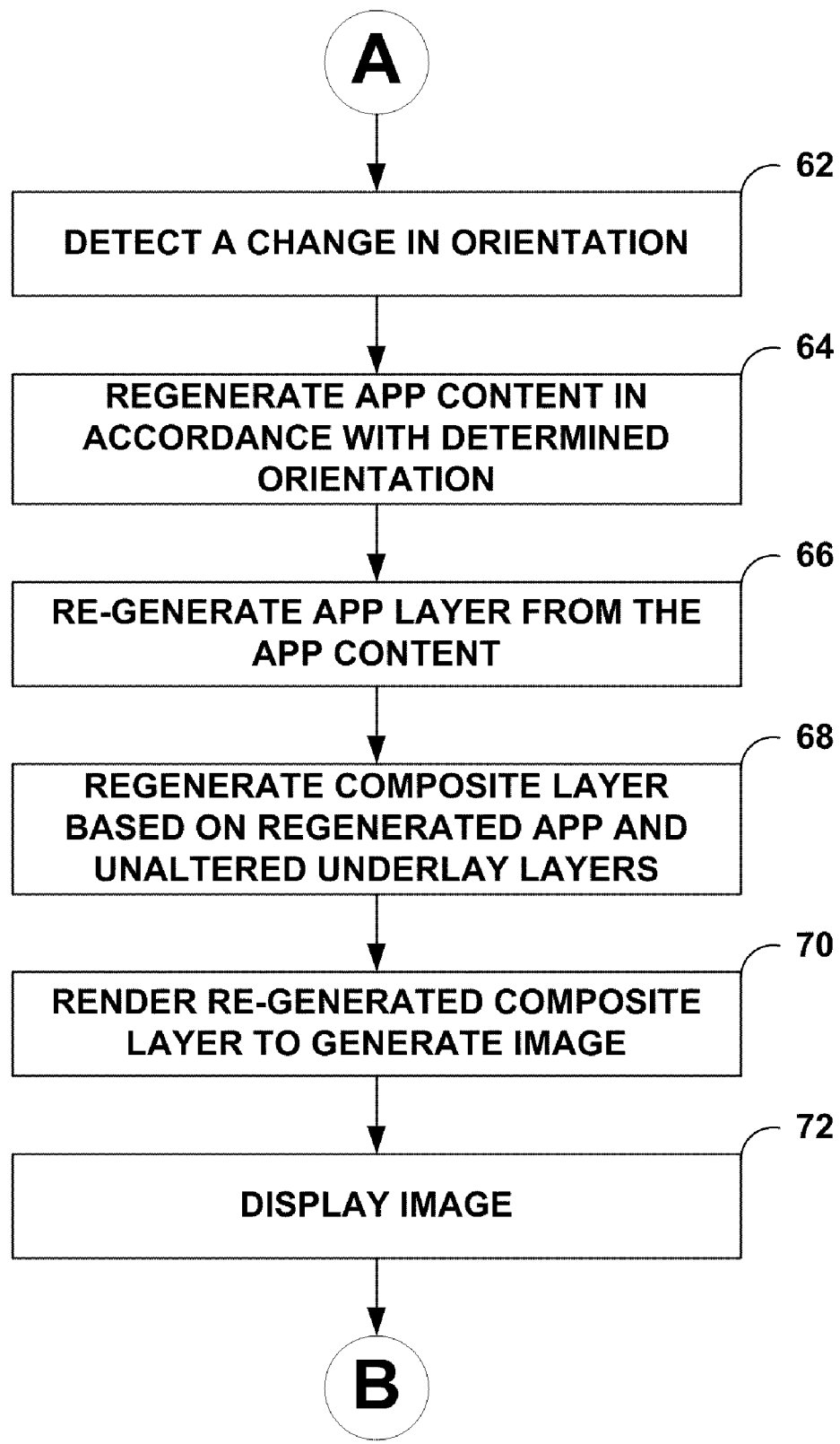
Figure 3C:
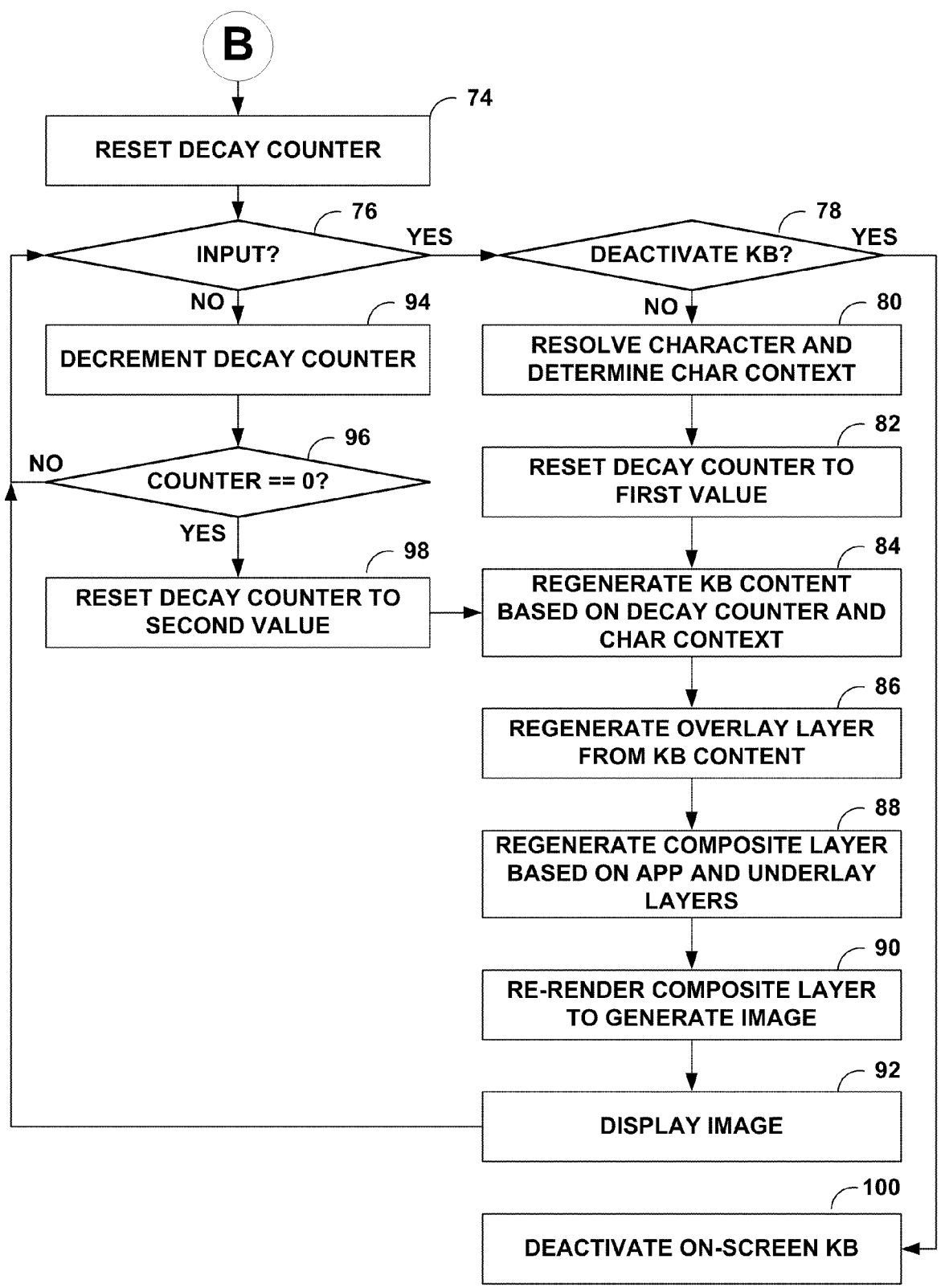

FIGS. 3A-3C are flowcharts illustrating example operation of a computing device, such as mobile device 10 of FIG. 2, in implementing the techniques described in this disclosure. While described with respect to mobile device 10, the techniques may be implemented by any computing device and should not be limited to the example described herein.

Referring to FIG. 3A, a user, such as user 14 of FIGS. 1A-1D, may initially interact with mobile device 10 to invoke an application, such as a web or Internet browser application, by selecting a web browser icon displayed by touch-screen display 16. Touch-screen display module 32E may resolve the location of the touch, whereupon input processing module 30 may determine that the touch selected the icon based on the location returned by touch-screen display module 32E. Input processing module 30 may then invoke software applications 24.

Software applications 24, upon being invoked, may first determine an orientation of mobile device 10 (44). To determine the orientation, software applications 24 may poll orientation module 32F, which may report an angle from the pull of gravity or some other reference point external from mobile device 10. Software applications 24 may then generate application content 18' based on the determined orientation in the manner described above (46). Software applications 24 may then forward application content 18' to graphics rendering module 28. Graphics rendering module 28 may generate application layer 34A from application content 18' and render application content 18' to generate an image 36 (48, 50). Graphics rendering module 28 may forward image 36 to touch-screen display module 32E, which presents image 36 to user 14 via touch-screen display 16 (51).

User 14 may then, at some point, interact with mobile device 10 to activate translucent on-screen keyboard 12 (52). As described above, user 14 may, as one example, shake or otherwise move mobile device 10 in a defined directional motion, e.g., up or down, to activate on-screen keyboard 12. As other examples, this activation may occur by way of a dedicated keyboard button 19 or by way of contextual application, as described above. Regardless, input processing module 30 or software applications 24, depending on the form of activation, may invoke on-screen keyboard module 26. In response to this activation, keyboard module 26 may generate, as described above, keyboard content 12' regardless of the determined orientation and forward this keyboard content 12' to graphics rendering module 28 (54). Graphics rendering module 28 may generate overlay layer 34B based on keyboard content 12' and then generate composite layer 34C based on application layer 34A and overlay layer 34B (56, 58). Graphics rendering module 28 may then render composite layer 34C to generate image 36, which graphics rendering module 28 forwards to touch-screen display module 32E for display via touch-screen display 16 to user 14 (60, 61).

Referring to FIG. 3B, mobile device 10 may, at some point, detect a change in orientation (62). That is, orientation module 32F may detect a change in orientation and issue an update message, such as an interrupt, to input processing module 30 informing input processing module 30 of the change in orientation. Alternatively, software applications 24 may, while active or at least while actively being displayed, continually or periodically poll orientation module 32F to detect a change in orientation. Regardless, in response to detecting this change in orientation, e.g., a change from portrait to landscape orientation, software applications 24 may regenerate application content 18' in accordance with the determined orientation (64). Software applications 24 may forward regenerated application content 18' to graphics rendering module 28.

Graphics rendering module 28 may, upon receiving regenerated application content 18', regenerate application layer 34A and then regenerate composite layer 34C based on regenerated application layer 34A and unchanged or static overlay layer 34B (66, 68). Graphics rendering module 28 may then re-render composite layer 34C to generate a new image 36 and forward this image 36 to touch-screen display module 32E, which presents or displays image 36 via touch-screen display 16 (70, 72).

Meanwhile, after generating keyboard content 12', decay module 38 of on-screen keyboard module 26 may reset decay counter 40 to a first value (74). On-screen keyboard module 26 may then "listen" for a selection of one of the plurality of virtual keys of virtual keyboard 12 by waiting for input from input processing module 30 (76). If input processing module 30 forwards input to on-screen keyboard module 26 ("YES" 76), on-screen keyboard module 26 may first determine whether the input deactivates virtual keyboard 12 (78). That is, on-screen keyboard module 26 may determine whether user 14 selected keyboard button 19 to deactivate on-screen keyboard 12 in the explicit activation/deactivation instance or whether user 14 selected the "(ret)" virtual key of virtual keyboard 12 in the context activation instance. As another example, the deactivation may occur by user 12 shaking or otherwise moving mobile device 10 in a defined second directional motion, e.g., downward.

If not deactivated ("NO" 78), on-screen keyboard module 26 may determine, based on the received input, the key selected and resolve the character corresponding to the selected key. On-screen keyboard module 26 may also determine the character ("char") context (80). The character context refers to the above described process whereby on-screen keyboard module 26 accesses dictionary 42 to determine those characters of the alphabet of a given language likely to follow the selected or resolved character. In any event, upon receiving this character input, decay module 38 of on-screen keyboard module 26 may reset decay counter 40 to the same first value (82).

On-screen keyboard module 26 may then re-generate keyboard content 12' based on decay counter 40 and the determined character context (84). That is, given the reset value of decay counter 40, on-screen keyboard module 26 may generate keyboard content 12' to define virtual keyboard 12 to have a first translucency associated with the first value. On-screen keyboard module 26 may also generate keyboard content 12' to modify the baseline translucency associated with the decay counter reset values for particular keys of virtual keyboard 12 such that certain keys not defined within the character context are more translucent, as described above. Notably, however, on-screen keyboard module 26 generates keyboard content 12' without reference to the determined orientation.

After regenerating keyboard content 12', on-screen keyboard module 26 may forward this regenerated keyboard content 12' to graphics rendering module 28. Graphics rendering module 28 may regenerate overlay layer 34B from regenerated keyboard content 12' and then regenerate composite layer 34C from application layer 34A and regenerated overlay layer 34B, as described above (86, 88). Also as described above, graphics rendering module 28 may re-render composite layer 34C to generate image 36, which graphics rendering module 28 may forward to touch-screen display module 32E for display to user 14 via touch-screen display 16 (90, 92).

While presenting this image 36 via touch-screen display 16 or if input is not received from user 14 ("NO" 76), decay module 38 of on-screen keyboard module 26 may decrement decay counter 40 (94). Decay module 38 may determine whether decay counter 40 equals zero (96). If decay counter 96 does not equal zero ("NO" 96), decay module 38 may continue to way for input and, if no input is receive ("NO" 76), decrement decay counter 40 until decay counter 40 reaches zero ("YES" 96). Once decay counter 40 reaches zero, decay module 38 resets decay counter 40 to a second value, which is typically less than the first value, as described above (98). On-screen keyboard module 26 may then regenerate keyboard content 12' based on decay counter 40 and the character context, as described above (84). Notably, on-screen keyboard module 26 may generate keyboard content 12' so as to further increase the translucency of on-screen keyboard 12 when displayed by touch-screen display 16.

Graphics rendering module 28 may regenerate overlay layer 34B and composite layer 34C based on application layer 34A and overlay layer 34B (86, 88). Next, graphics rendering modules 28 may, as described above, re-render composite layer 34C to generate image 36 once again (90). Touch-screen display module 32E may display image 36 via touch-screen display 16 (92). In this respect, mobile device 10 may slowly fade on-screen keyboard 12 into application content 18 in response to a period of inactivity where user 14 does not interact with keyboard 12.

In some instances, mobile device 10 may, although not explicitly shown in FIG. 3C, automatically deactivate on-screen keyboard 12 in response to a long period of inactivity by user 14. In this instance, on-screen keyboard module 26 may periodically reset decay counter 40 with a smaller second value until the second value equals zero. Upon decrementing the second value to zero, on-screen keyboard module 26 may deactivate virtual keyboard 12, thereby preserving power by reducing computing overhead associated with maintaining and presenting virtual keyboard 12. Otherwise, without this feature, on-screen keyboard module 26 may analyze each input to determine whether user 14 has selected, either by way of a dedicated keyboard button 19 or a particular touch selecting a "(ret)" virtual key, to deactivate virtual keyboard 12 (78). If user 14 has selected in this manner to deactivate virtual keyboard 12, on-screen keyboard module 26 may deactivate translucent on-screen keyboard 12 (100).

FIGS. 4A-4G are screenshots illustrating example images 102A-102G, respectively, presented by a touch-screen display, such as touch-screen display 16 of FIGS. 1A-1D, in accordance with the techniques set forth in this disclosure. FIGS. 4A-4D are screenshots illustrating the context adaptive aspect of the techniques in which characters corresponding to keys of the virtual keyboard are distinguished from other keys based on the word context, as derived from previously selected keys. FIGS. 4D-4G are screen shots illustrating the decay aspects of the techniques in which the virtual keyboard slowly fades into application content for a set time of inactivity in which a user, such as user 14, does not interact with the keyboard.

Figure 4A:
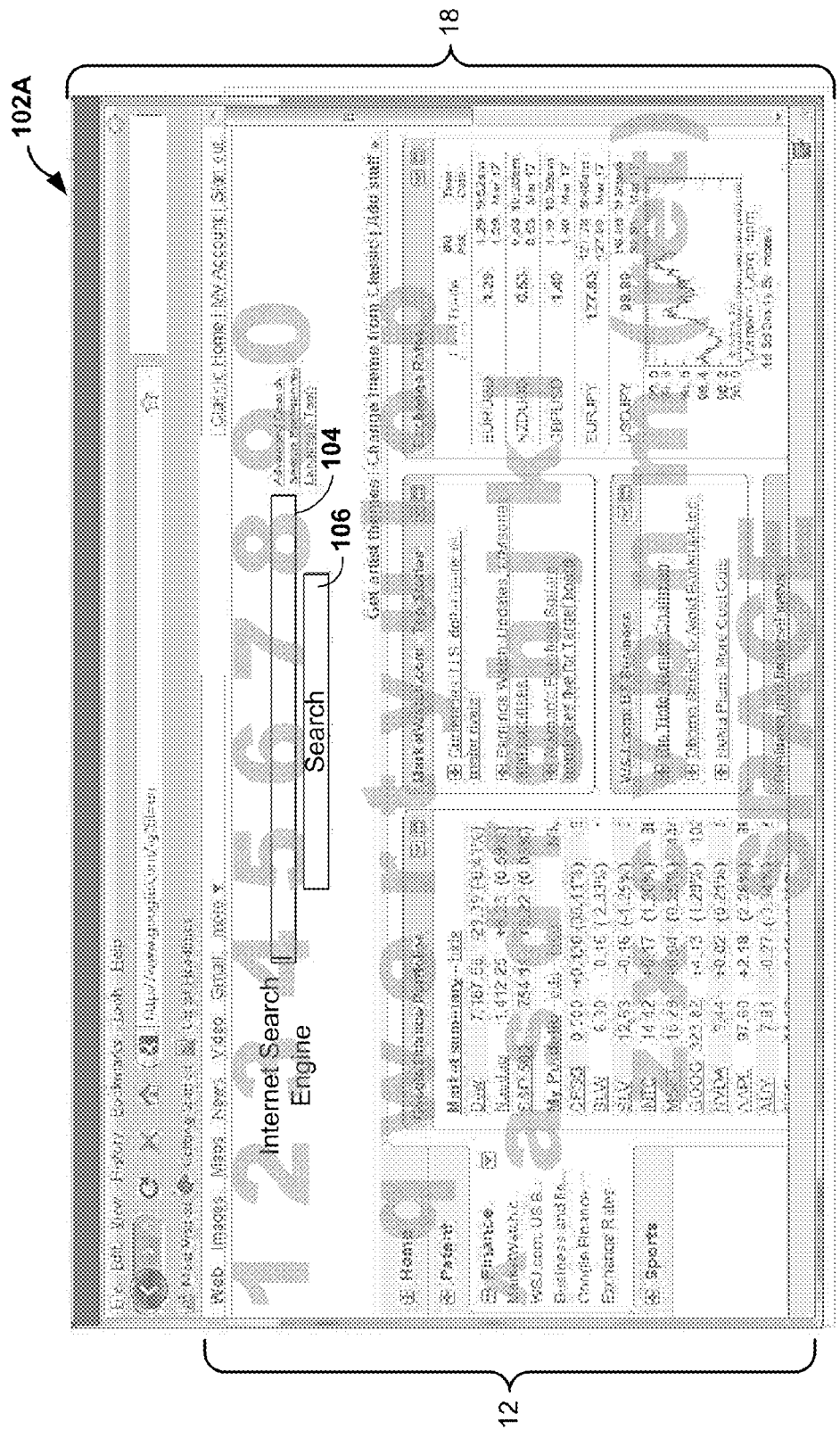
FIGS. 4A-4G are screenshots illustrating example images presented by a touch-screen display in accordance with the techniques set forth in this disclosure.

Referring to FIG. 4A, image 102A is generated from two layers, such as application layer 34A and an overlay layer 34B both shown in FIG. 2. Application layer 34A includes application content, such as application content 18', which touch-screen display 16 presents as application content 18 of image 102A. In the example of FIGS. 4A-4G, application content 18 comprises an Internet browser graphical user interface that presents an Internet search engine webpage. This website includes a text entry field 104 and a search button 106. Text entry field 104 may, when selected, accept text or character input from user 14 that defines a search string. Search button 106 may, when selected, cause the Internet browser application to submit the entered search string to a search server, which may then search the internet for the entered search string and return to the Internet search browser another webpage listing the results of the search.

User 14 may select text input field 104, whereupon input processing module 30 of mobile device 10, as shown in FIG. 2, may forward the location of the touch to software applications 24, which in this instance may comprise the Internet browser application that generates application content 18'. Software applications 24 may resolve the location of the touch as selecting text entry field 104 and automatically invoke on-screen keyboard module 26 to generate keyboard content 12', which graphics rendering module 28 may layer onto application content 18' in the manner described above before rendering and displaying this composite image 102A. In this manner, mobile device 10 may implement the techniques to simultaneously present application content 18 and virtual keyboard 12.

Figure 4B:
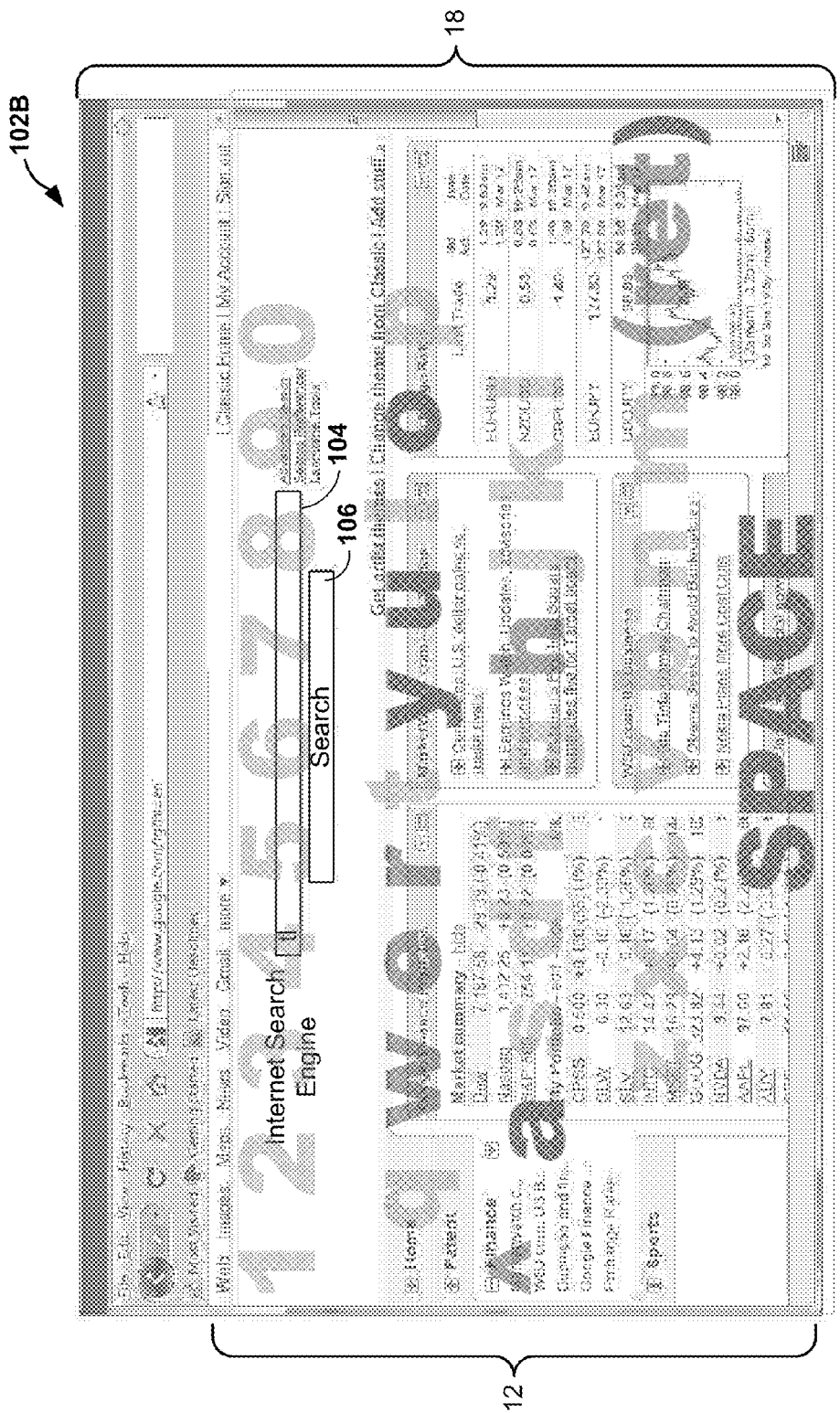

FIG. 4B is a screenshot illustrating image 102B that shows the effects of user 14 selecting the 't' key of virtual keyboard 12 by touching the 't' key. Touch-screen module 32E receives this touch and determines the location, whereupon input processing module 30 forwards the location of this touch to on-screen keyboard module 26. On-screen keyboard module 26 determines which key was selected based on the location and forwards the selected character to software applications 24. Software applications 24 may then regenerate application content 18' to update text entry field 104 to display the 't' character, as shown in FIG. 4B.

Meanwhile, keyboard module 26 may access dictionary 42 based on the selected 't' character to determine the word context in the manner described above. On-screen keyboard module 26 may determine based on the selection of the 't' character which of the remaining characters are most likely to follow the 't' character in a word beginning with the selected 't' character. On-screen keyboard module 26 may determine that the characters 'w,' 'e,' 'r,' 'y,' 'u,' 'o,' 'a,' and 'h' are most likely to follow the selected 't' character. On-screen keyboard module 26 may then reduce the translucency of the keys corresponding to these determined characters to distinguish these corresponding keys from the other keys corresponding to characters unlikely to follow the selected 't' character. In other words, on-screen keyboard module 26 may regenerate keyboard content 12' such that graphics rendering module 28 renders virtual keyboard 12 in the manner shown in FIG. 4B, where the 'w,' 'e,' 'r,' 'y,' 'u,' 'o,' 'a,' and 'h' keys appear less translucent than the remaining keys. In this manner, the techniques may facilitate correct entry of words by adapting the appearance or format of the keys of virtual keyboard 12 based on the context of previously selected characters.

Figure 4C:
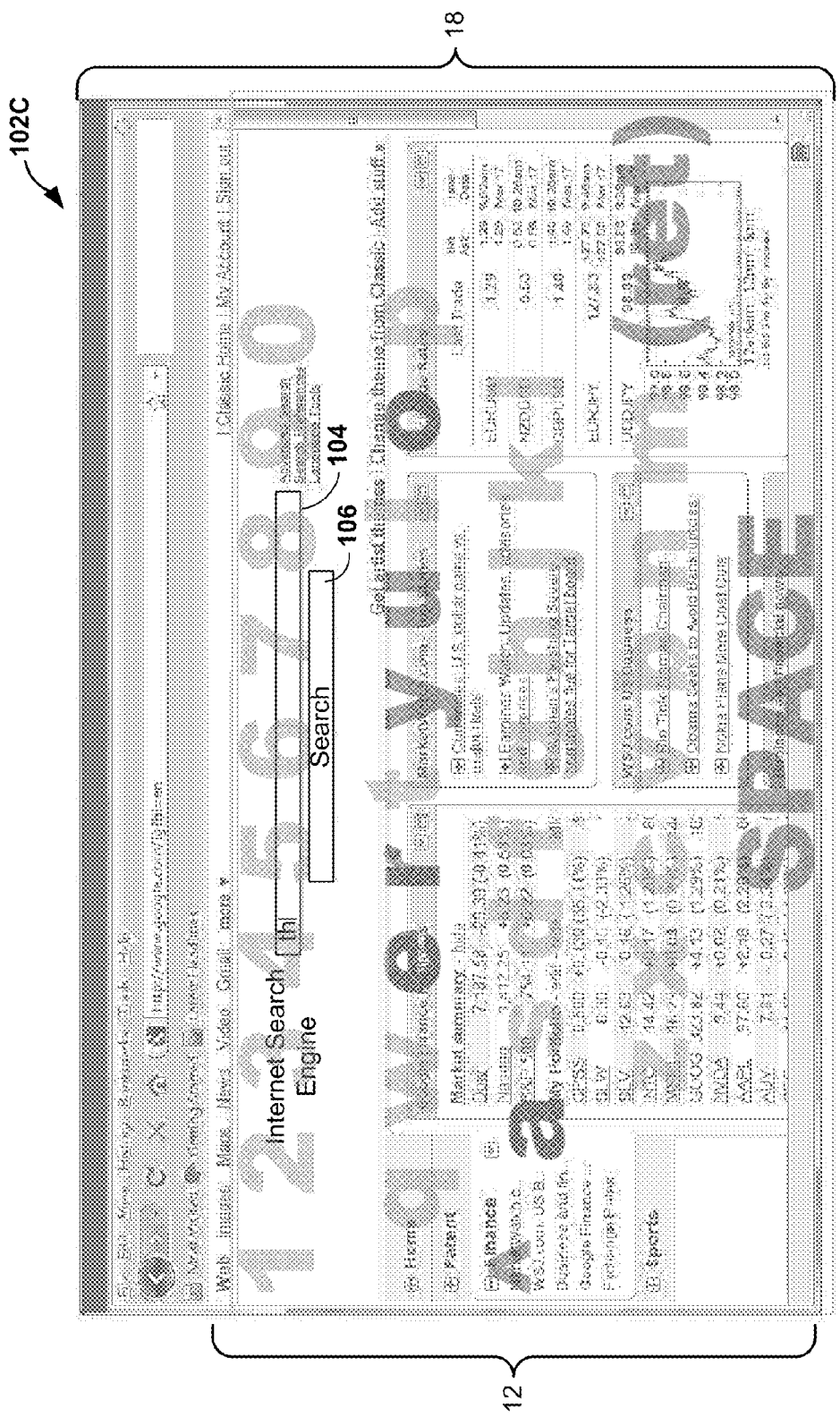

FIG. 4C is a screenshot illustrating image 102C showing the result of user 14 selecting the 'h' key of virtual keyboard 12. Touch-screen module 32E receives this touch and determines the location, whereupon input processing module 30 forwards the location of this touch to on-screen keyboard module 26. On-screen keyboard module 26 determines which key was selected based on the location and forwards the selected character to software applications 24. Software applications 24 may then regenerate application content 18' to update text entry field 104 to display the 'h' character, as shown in FIG. 4C.

Meanwhile, keyboard module 26 may access dictionary 42 based on the selected 'h' character to determine the word context in the manner described above. On-screen keyboard module 26 may determine based on the selection of the 't' and 'h' characters which of the remaining characters are most likely to follow the 'h' character in a word beginning with the previously selected 't' and 'h' characters. On-screen keyboard module 26 may determine that the characters 'e,' 'r,' 'y,' 'u,' 'o,' and 'a' are most likely to follow the selected 't' and 'h' characters. On-screen keyboard module 26 may then reduce the translucency of the keys corresponding to these determined characters to distinguish these corresponding keys from the other keys corresponding to characters unlikely to follow the selected 't' and 'h' characters. In other words, on-screen keyboard module 26 may regenerate keyboard content 12' such that graphics rendering module 28 renders virtual keyboard 12 in the manner shown in FIG. 4B, where the 'e,' 'r,' 'y,' 'u,' 'o,' and 'a' keys appear less translucent than the remaining keys.

Figure 4D:
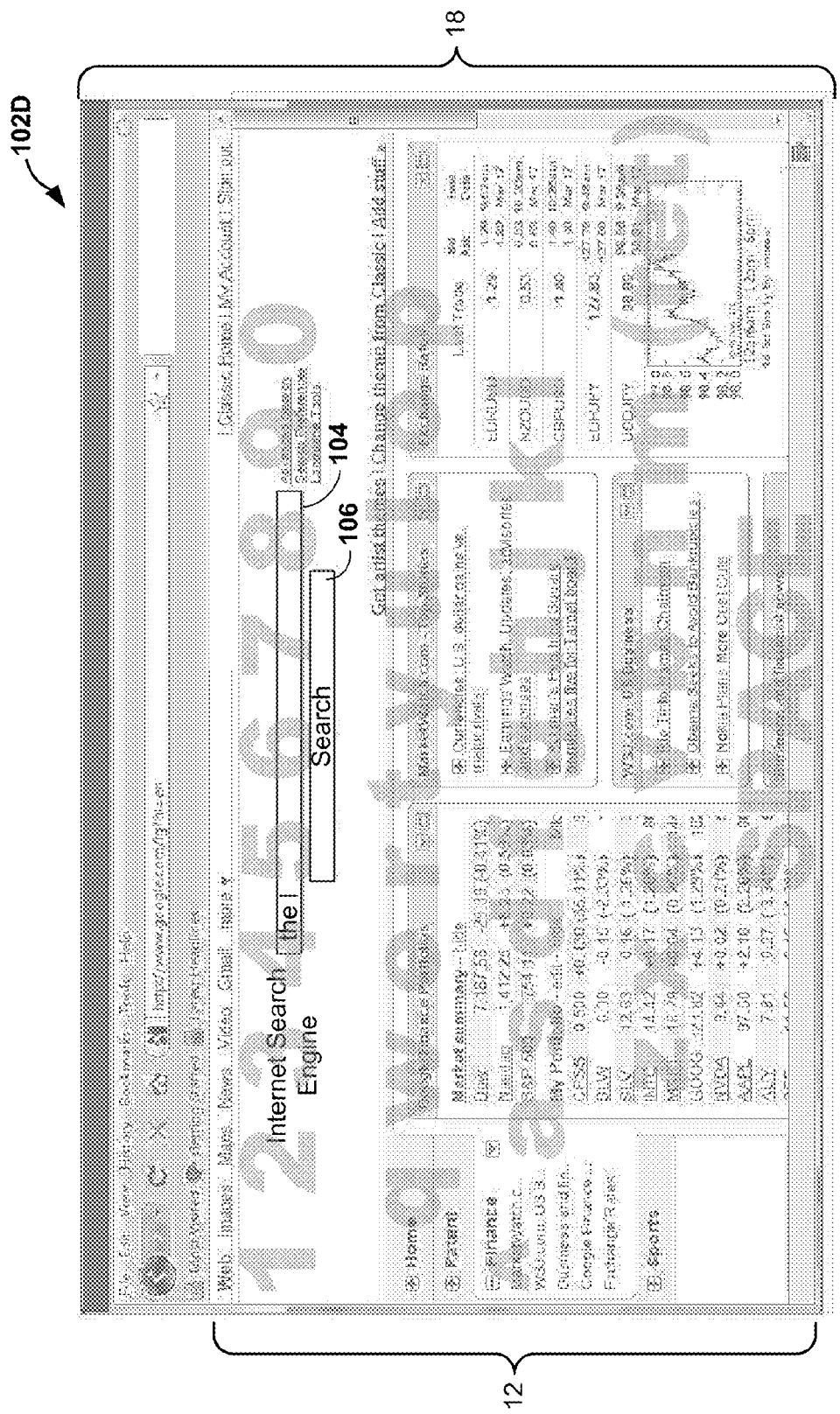

FIG. 4D is a screenshot illustrating image 102D showing the result of user 14 selecting the 'e' key followed by the "SPACE" key of virtual keyboard 12. Touch-screen module 32E receives these touches and determines each location of the touch, whereupon input processing module 30 forwards these locations to on-screen keyboard module 26. On-screen keyboard module 26 determines which keys were selected based on the location and forwards the selected characters to software applications 24. Software applications 24 may then, for each touch, regenerate application content 18' to update text entry field 104 to display the 'e' character followed by the whitespace ' ' character, as shown in FIG. 4C.

Meanwhile, keyboard module 26 may clear the determined word context based on the selection of the SPACE key, as the SPACE key signals the end of the current word. Accordingly, on-screen keyboard module 26 may regenerate keyboard content 12' such that graphics rendering module 28 renders virtual keyboard 12 in the manner shown in FIG. 4D, where all of the keys of virtual keyboard 12 are formatted to have substantially the same level of translucency. Decay module 38 of on-screen keyboard module 26 may after each generation of keyboard content 12' reset decay counter 40 to a first value. Decay module 38 may decrement decay counter 40 in the manner described above so long as user 14 does not interact with virtual keyboard 12. Upon decrementing decay counter to zero, decay module 38 may reset decay counter 40 to a second value that is typically less than the first value. On-screen keyboard module 26 may then determine whether to deactivate on-screen keyboard 12 by determining an updated translucency for virtual keyboard 12. If this updated translucency does not exceed a deactivation threshold, on-screen keyboard module 26 regenerate keyboard content 12' to increase the translucency of virtual keyboard 12 to the updated translucency.

Figure 4E:
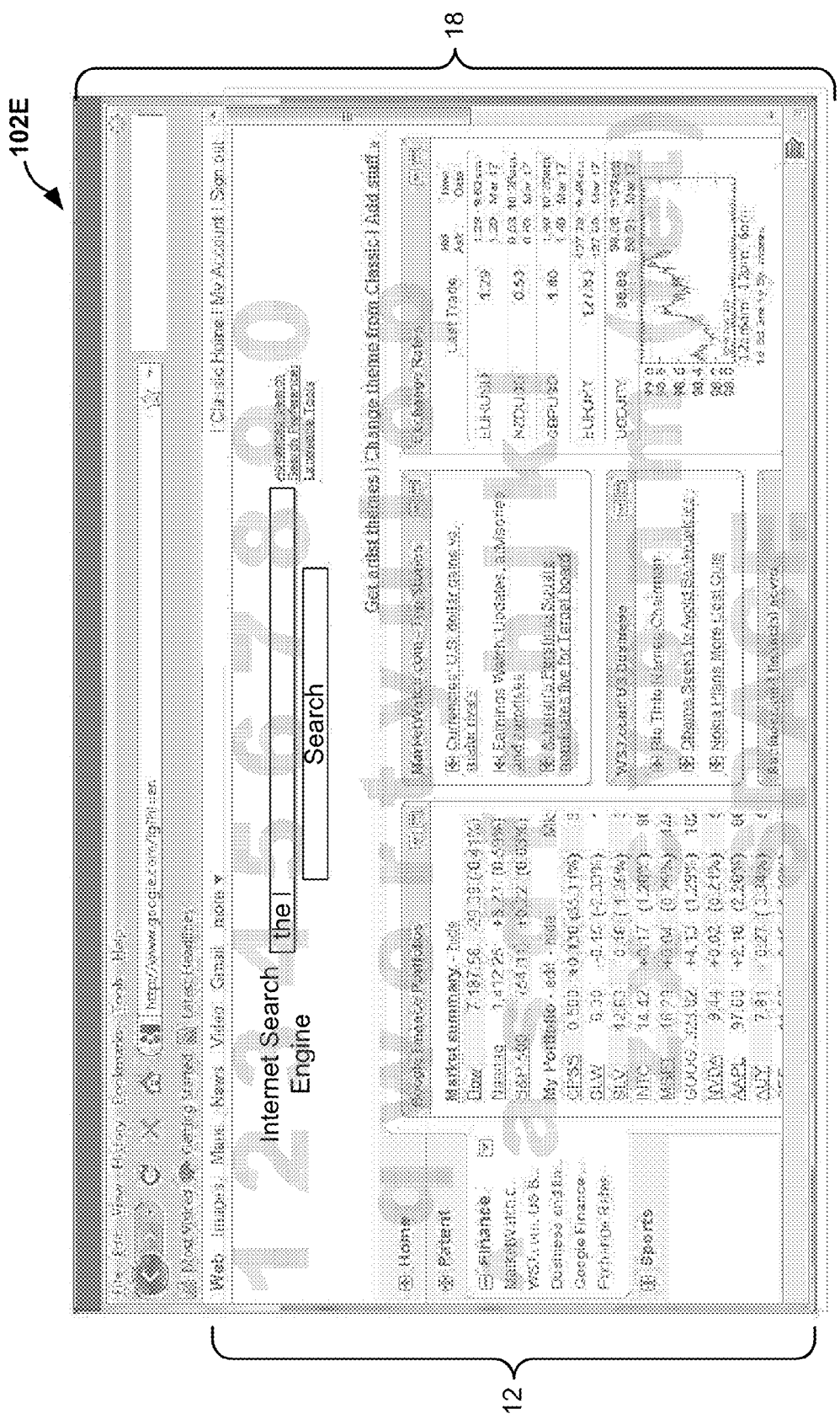

FIG. 4E is a screenshot illustrating image 102E that includes a virtual keyboard 12 with incrementally increased translucency when compared to virtual keyboard 12 of FIG. 4E. Decay module 38 of on-screen keyboard module 26 may continue to decrement decay counter 40 in this manner so long as user 14 does not interact with virtual keyboard 12 or otherwise touch touch-screen display 16. Upon decrementing decay counter 40 to zero once again, decay module 38 may reset decay counter 40 to a third value, which may be less than the second value, thereby speeding the decaying appearance of virtual keyboard 12. In response to once again decrementing decay counter 40 to zero, on-screen keyboard module 26 may first determine whether to deactivate virtual keyboard 12. On-screen keyboard module 26 may determine whether to deactivate on-screen keyboard 12 by determining an updated translucency for virtual keyboard 12. If this updated translucency does not exceed the deactivation threshold, on-screen keyboard module 26 regenerate keyboard content 12' to increase the translucency of virtual keyboard 12 to the updated translucency.

Figure 4F:
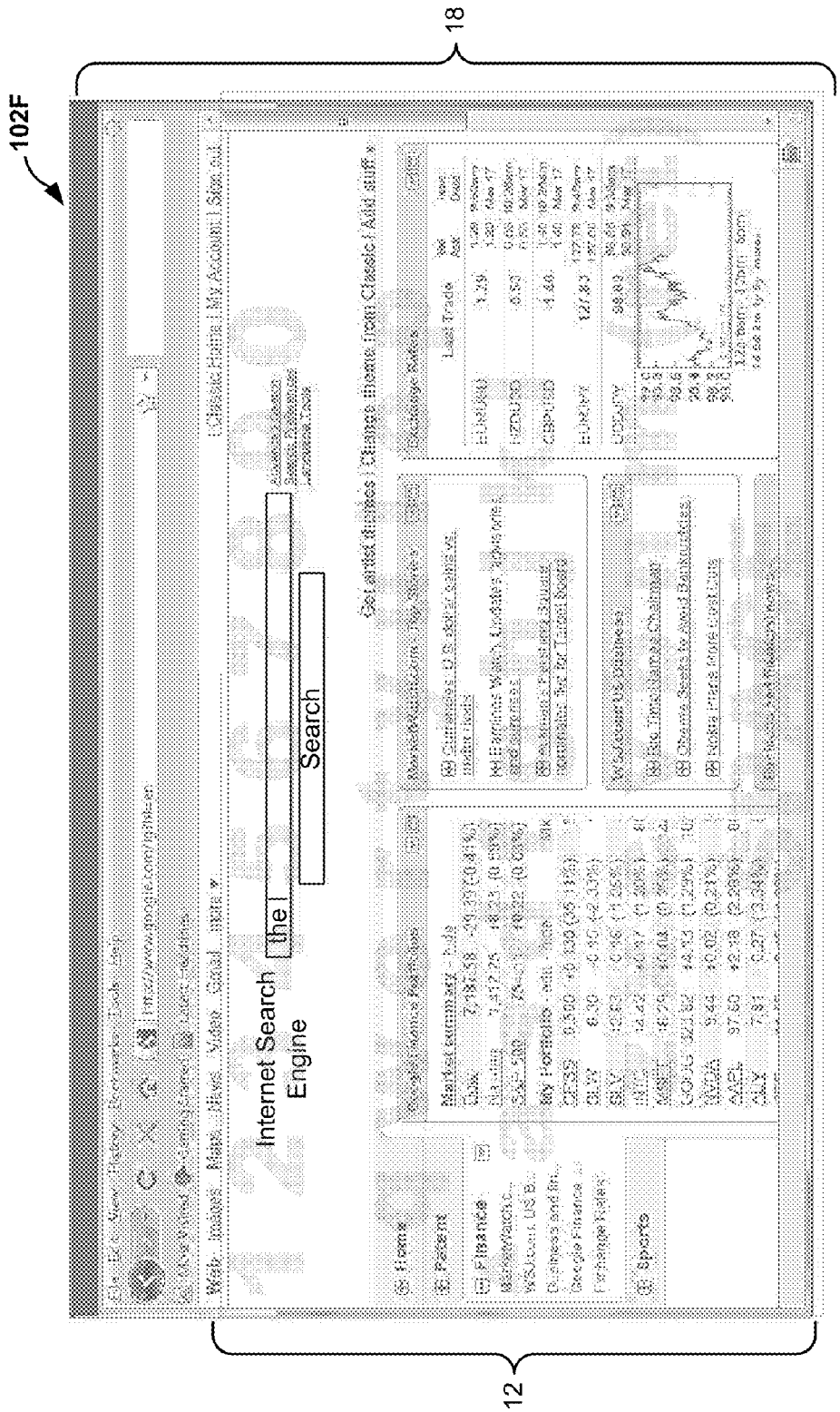
Figure 4G:
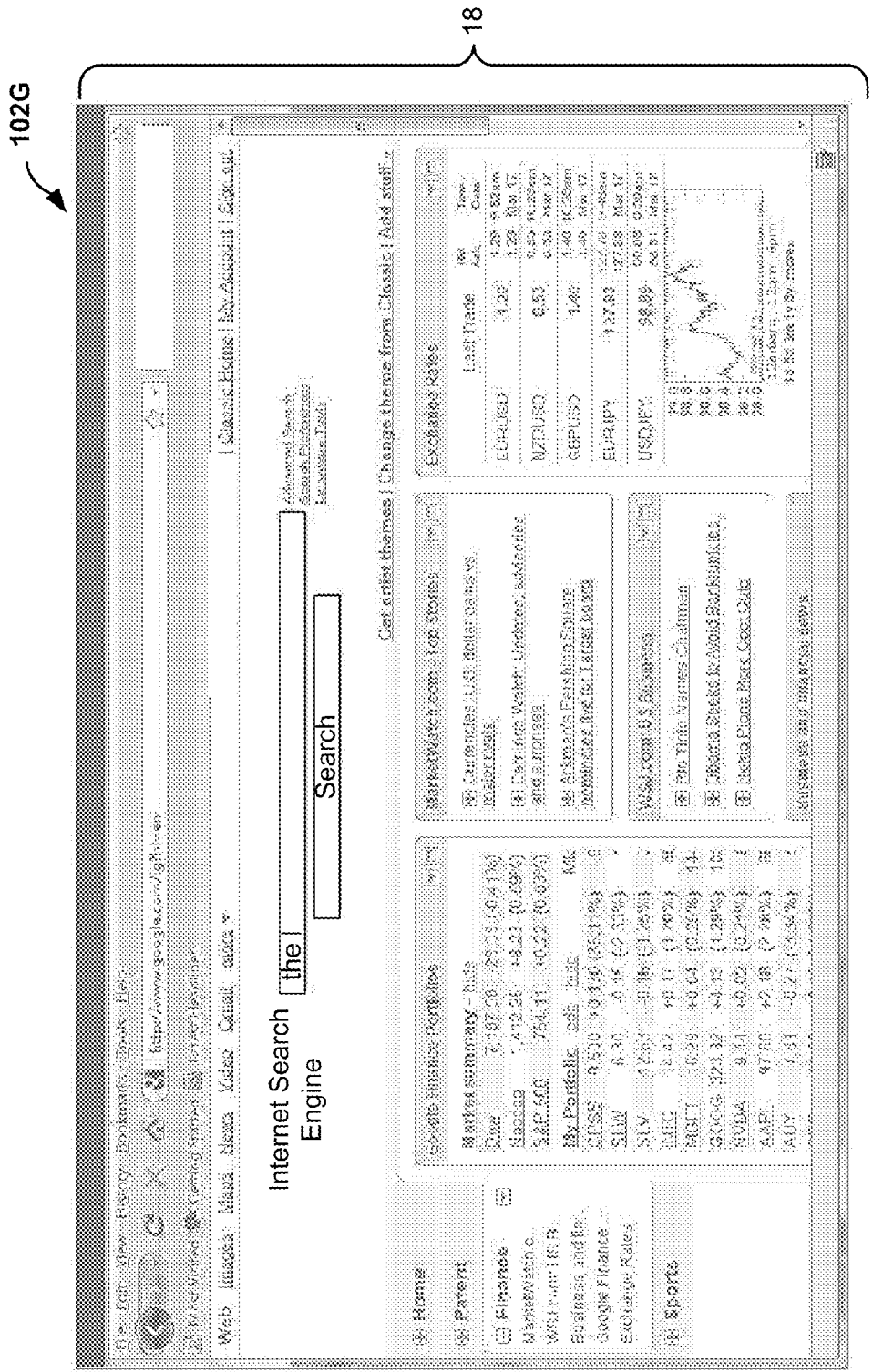

FIG. 4F is a screenshot illustrating image 102F that includes a virtual keyboard 12 with incrementally increased translucency when compared to virtual keyboard 12 of FIG. 4E. Decay module 38 of on-screen keyboard module 26 may continue to decrement decay counter 40 in this manner so long as user 14 does not interact with virtual keyboard 12 or otherwise touch touch-screen display 16. Upon decrementing decay counter 40 to zero once again, decay module 38 may reset decay counter 40 to a fourth value, which may be less than the third value. In response to once again decrementing decay counter 40 to zero, on-screen keyboard module 26 may first determine whether to deactivate virtual keyboard 12. On-screen keyboard module 26 may determine whether to deactivate on-screen keyboard 12 by determining an updated translucency for virtual keyboard 12. Assuming for purposes of illustrating that the updated translucency exceeds the deactivation threshold, on-screen keyboard module 26 automatically deactivate on-screen keyboard 12, resulting in image 102G shown in FIG. 4G that includes only application content 18.

In this manner, the context adaptive aspect of the techniques may enable mobile device 10 to receive a selection of one of the keys, resolve the selection to determine which one of the plurality of characters of the character set, e.g., alphabet, was selected and update a word context to include the selected character. The word context may comprises one or more characters previously selected to form a word, where a word is denoted by spaces or other punctuation. Mobile device 10 may then regenerating the keyboard content such that a set of the plurality of keys of translucent on-screen keyboard 12 have a first translucency and a different set of the plurality of keys of translucent on-screen keyboard 12 have a second translucency. Mobile device 10 may next regenerate the overlay layer based on the regenerated keyboard content that defines the translucent on-screen keyboard in the static orientation regardless of the determined orientation, regenerate the composite layer based on the re-generated overlay layer and the unaltered application layer, re-rendering the composite image based on the regenerated composite layer, and display the re-rendered composite image via the touch-screen display to the user.

In other words, the techniques may enable a mobile device having a touch-screen display to displays content from a software application executing on the mobile device and keyboard content defining a translucent on-screen keyboard such that the content and the translucent on-screen keyboard are displayed in the same orientation relative to the mobile device. In accordance with the techniques, the mobile device may further comprise an orientation module that detects a change in orientation of the mobile device. In response to detecting the change in the orientation of the mobile device, the touch-screen display may display the content and the translucent on-screen keyboard in a different orientation from one another relative to the mobile device. The touch-screen display may not change the orientation of the translucent on-screen keyboard. That is, the touch-screen display displays the translucent on-screen keyboard in the same orientation despite the detected change in orientation of the mobile device. In this respect, the on-screen translucent keyboard remains statically oriented and the keyboard may be referred to as a statically oriented translucent on-screen keyboard.

Various embodiments of the invention have been described. These and other embodiments are within the scope of the following claims.

The invention claimed is:

1. A method comprising:
determining, with a mobile device having a touch-screen display, an orientation of the mobile device;
generating, in accordance with the determined orientation, an application layer based on content received from a software application executing on the mobile device;
generating, with the mobile device, an overlay layer based on keyboard content that defines a translucent on-screen keyboard in a static orientation relative to the mobile device regardless of the determined orientation;
rendering, with the mobile device, a composite image from the content of the application layer and the keyboard content of the overlay layer; and
displaying, with the mobile device, the composite image via the touch-screen display such that the content is displayed in the determined orientation and the translucent on-screen keyboard is displayed in the static orientation.

2. The method of claim 1,
wherein the orientation of the mobile device and the display of the content from the software application is in a portrait orientation, and
wherein the static orientation for the on-screen keyboard is a landscape orientation.

3. The method of claim 2, further comprising:
detecting a change in the orientation of the mobile device from the portrait orientation to the landscape orientation;
regenerating the application layer in accordance with the determined landscape orientation;
re-rendering the composite image from the application content of the regenerated application layer and the keyboard content from the overlay layer without altering the overlay layer; and
displaying the re-rendered composite image via the touch-screen display such that the regenerated application layer is displayed in the same landscape orientation as the translucent on-screen keyboard.

4. The method of claim 1, further comprising:
generating, with the mobile device, the keyboard content such that the translucent on-screen keyboard has a first translucency;
setting, with the mobile device, a decay counter after generating the keyboard content;
decrementing, with the mobile device, the decay counter;
determining whether the decay counter equals zero;
in response to the determination that the decay counter equals zero, regenerating, with the mobile device, the keyboard content such that the translucent on-screen keyboard has a second translucency, wherein the first translucency is less than the second translucency;
regenerating, with the mobile device, the overlay layer based on the regenerated keyboard content that defines the translucent on-screen keyboard in the static orientation regardless of the determined orientation;
re-rendering the composite image from the keyboard content of the regenerated overlay layer and the content form the application layer without altering the application layer; and
displaying the re-rendered composite layer via the touch-screen display to the user.

5. The method of claim 4, further comprising:
detecting, with the mobile device, an input from a user;
resetting, with the mobile device, the decay counter in response to the input;
regenerating, in response to resetting the decay counter, the keyboard content such that the translucent on-screen keyboard has the first translucency;
regenerating the overlay layer based on the regenerated keyboard content that defines the translucent on-screen keyboard in the static orientation regardless of the determined orientation;
re-rendering the composite image from the keyboard content of the regenerated overlay layer and the content form the application layer without altering the application layer; and
displaying the re-rendered composite image via the touch-screen display.

6. The method of claim 1, further comprising:
rendering, with the mobile device, the application layer as an application image; and
displaying, with the mobile device, the application image via the touch-screen display; and
receiving, with the mobile device, an input from a user that activates the translucent on-screen keyboard.

7. The method of claim 6,
wherein the application content comprises an input text field,
wherein displaying the application image comprises displaying via the touch-screen display the input text field, and wherein receiving the input from the user that activates the translucent on-screen keyboard comprises receiving a touch input from the user via the touch-screen display that selects the input text field presented via the touch-screen display.

8. The method of claim 6,
wherein the mobile device comprises a physical button for activating the translucent on-screen keyboard, and
wherein receiving the input from the user that activates a translucent on-screen keyboard comprises receiving an activation input from the user via the physical button.

9. The method of claim 6,
wherein the mobile device comprises a motion detection module that detects a defined directional movement of the mobile device, and
wherein receiving the input from the user that activates a translucent on-screen keyboard comprises receiving an activation input from the motion detection module in response to the motion detection module detecting the defined directional movement of the mobile device.

10. The method of claim 1,
wherein the translucent on-screen keyboard comprises a plurality of keys each of which corresponds to one of a plurality of characters of a character set;
receiving a selection of one of the keys;
resolving the selection to determine which one of the plurality of characters of the character set was selected;
updating a word context to include the selected character, wherein the word context comprises one or more characters previously selected to form a word;
regenerating the keyboard content such that a set of the plurality of keys of the translucent on-screen keyboard have a first translucency and a different set of the plurality of keys of the translucent on-screen keyboard have a second translucency, wherein the first and second translucencies are different;
regenerating the overlay layer based on the regenerated keyboard content that defines the translucent on-screen keyboard in the static orientation regardless of the determined orientation;
re-rendering the composite image from the keyboard content of the regenerated overlay layer and the content form the application layer without altering the application layer; and
displaying the re-rendered composite image via the touch-screen display.

11. A mobile device comprising:
a orientation module that determines an orientation of the mobile device;
a control unit that executes a software application to generate content in accordance with the determined orientation,
wherein the control unit includes a keyboard module that generates keyboard content that defines a translucent on-screen display in a static orientation relative to the mobile device,
wherein the control unit further includes a graphics rendering module that generates, in accordance with the determined orientation, an application layer based on the content received from the software application, generates an overlay layer based on the keyboard content in the static orientation and regardless of the determined orientation, and renders a composite image from the content of the application layer and the keyboard content of the overlay layer; and
a touch-screen display that displays the composite image such that the content is displayed in the determined orientation and the translucent on-screen keyboard is displayed in the static orientation.

12. The mobile device of claim 11,
wherein the orientation module determines that the orientation of the mobile device is a portrait orientation,
wherein the static orientation for the on-screen keyboard is a landscape orientation,
wherein the touch-screen display displays the composite image such that the content is displayed in the portrait orientation and the translucent on-screen keyboard is displayed in the landscape orientation.

13. The mobile device of claim 12,
wherein the orientation module detects a change in the orientation of the mobile device from the portrait orientation to the landscape orientation,
wherein the graphics rendering module regenerates the application layer in accordance with the determined landscape orientation, re-renders the composite image from the application content of the regenerated application layer and the keyboard content from the overlay layer without altering the overlay layer, and
wherein the touch-screen display displays the re-rendered composite image such that the regenerated application layer is displayed in the same landscape orientation as the translucent on-screen keyboard.

14. The mobile device of claim 11,
wherein the keyboard module generates the keyboard content such that the translucent on-screen keyboard has a first translucency, sets a decay counter after generating the keyboard content, decrements the decay counter, determines whether the decay counter equals zero, and in response to the determination that the decay counter equals zero, regenerates the keyboard content such that the translucent on-screen keyboard has a second translucency, wherein the first translucency is less than the second translucency,
wherein the graphics rendering module regenerates the overlay layer based on the regenerated keyboard content that defines the translucent on-screen keyboard in the static orientation regardless of the determined orientation and re-rendering the composite image from the keyboard content of the regenerated overlay layer and the content form the application layer without altering the application layer, and
wherein the touch-screen display displays the re-rendered composite layer.

15. The mobile device of claim 14,
wherein the control unit includes a touch-screen module that detects an input from a user via the touch-screen display;
wherein the keyboard module resets the decay counter in response to the input and regenerates, in response to resetting the decay counter, the keyboard content such that the translucent on-screen keyboard has the first translucency,
wherein the graphics rendering module regenerates the overlay layer based on the regenerated keyboard content that defines the translucent on-screen keyboard in the static orientation regardless of the determined orientation and re-renders the composite image from the keyboard content of the regenerated overlay layer and the content form the application layer without altering the application layer, and
wherein the touch-screen display displays the re-rendered composite image to the user.

16. The mobile device of claim 11,
wherein the graphics rendering module renders the application layer as an application image,
wherein the touch-screen display displays the application image, and
wherein the control unit comprises a user interface module that receives an input from a user activating the translucent on-screen keyboard.

17. The mobile device of claim 16,
wherein the application content comprises an input text field,
wherein the touch-screen display displays the input text field, and
wherein the user interface module includes a touch-screen module that receives a touch input from the user via the touch-screen display selecting the input text field presented via the touch-screen display.

18. The mobile device of claim 16, further comprising a physical button for activating the translucent on-screen keyboard, and
wherein the user-interface module comprises a buttons module that receives an activation input from the user in response to the user activating the physical button.

19. The method of claim 16,
wherein the user interface module includes a motion detection module that detects a defined directional movement of the mobile device, and
wherein the user-interface module receives the input via the motion detection module by the user moving the mobile device in the defined directional movement.

20. The mobile device of claim 11,
wherein the translucent on-screen keyboard comprises a plurality of keys each of which corresponds to one of a plurality of characters of a character set;
wherein the control unit comprises a touch-screen module that receives a selection of one of the keys via the touch-screen display,
wherein the keyboard module resolves the selection to determine which one of the plurality of characters of the character set was selected, updates a word context to include the selected character, wherein the word context comprises one or more characters previously selected to form a word and regenerates the keyboard content such that a set of the plurality of keys of the translucent on-screen keyboard have a first translucency and a different set of the plurality of keys of the translucent on-screen keyboard have a second translucency, wherein the first and second translucencies are different,
wherein the graphics rendering module regenerates the overlay layer based on the regenerated keyboard content that defines the translucent on-screen keyboard in the static orientation regardless of the determined orientation and re-renders the composite image from the keyboard content of the regenerated overlay layer and the content form the application layer without altering the application layer, and
wherein the touch-screen display displays the re-rendered composite image.

21. A computer-readable medium comprising instructions for causing a programmable processor to:
determine, with a mobile device having a touch-screen display, an orientation of the mobile device;
generate, in accordance with the determined orientation, an application layer based on content received from a software application executing on the mobile device;
generate, with the mobile device, an overlay layer based on keyboard content that defines a translucent on-screen keyboard in a static orientation relative to the mobile device regardless of the determined orientation;
render, with the mobile device, a composite image from the content of the application layer and the keyboard content of the overlay layer; and
display, with the mobile device, the composite image via the touch-screen display such that the content is displayed in the determined orientation and the translucent on-screen keyboard is displayed in the static orientation.

22. A method comprising:
displaying, with a touch-screen display of a mobile device, content from a software application executing on the mobile device and keyboard content defining a translucent on-screen keyboard such that the content and the translucent on-screen keyboard are displayed in a same orientation relative to the mobile device;
detecting, with the mobile device, a change in orientation of the mobile device; and
in response to detecting the change in the orientation of the mobile device, displaying, with the touch-screen display of the mobile device, the content from the software application and the keyboard content defining the translucent on-screen keyboard such that the content and the translucent on-screen keyboard are displayed in a different orientation from one another relative to the mobile device.

23. A method comprising:
generating, with a mobile device that includes a display and a motion detection unit, an application layer based on content received from a software application executing on the mobile device;
detecting, with the motion detection unit, a defined directional movement of the mobile device associated with activation of a translucent on-screen keyboard;
generating, with the mobile device, an overlay layer based on keyboard content that defines a translucent on-screen keyboard in response to detecting the defined directional movement;
rendering, with the mobile device, a composite image from the content of the application layer and the keyboard content of the overlay layer; and
displaying, with the mobile device, the composite image via the touch-screen display.

* * * * *